US011075840B1

(12) United States Patent
Qian et al.

(10) Patent No.: US 11,075,840 B1
(45) Date of Patent: Jul. 27, 2021

(54) DISAGGREGATION OF NETWORK TRAFFIC

(71) Applicant: F5 Networks, Inc., Seattle, WA (US)

(72) Inventors: Wei Qian, Seattle, WA (US); William Ross Baumann, Seattle, WA (US); Ning Kai Chen, Seattle, WA (US)

(73) Assignee: F5 NETWORKS, INC., Seattle, WA (US)

( * ) Notice: Subject to any disclaimer, the term of this patent is extended or adjusted under 35 U.S.C. 154(b) by 0 days.

(21) Appl. No.: 16/506,333

(22) Filed: Jul. 9, 2019

(51) Int. Cl.
*H04L 12/50* (2006.01)
*H04L 12/743* (2013.01)
*H04L 29/12* (2006.01)
*H04L 29/08* (2006.01)
*H04L 29/06* (2006.01)

(52) U.S. Cl.
CPC ........ *H04L 45/7453* (2013.01); *H04L 61/256* (2013.01); *H04L 67/1002* (2013.01); *H04L 67/42* (2013.01)

(58) Field of Classification Search
CPC ............... H04L 45/7453; H04L 61/256; H04L 67/1002; H04L 67/42
See application file for complete search history.

(56) References Cited

U.S. PATENT DOCUMENTS

| 7,102,996 | B1 | 9/2006 | Amdahl et al. |
| 7,395,349 | B1 | 7/2008 | Szabo et al. |
| 7,697,427 | B2 | 4/2010 | Amdahl et al. |
| 8,004,971 | B1 | 8/2011 | Szabo et al. |
| 9,762,492 | B2 | 9/2017 | Szabo et al. |
| 2013/0103785 | A1* | 4/2013 | Lyon .................. H04N 21/2385 709/217 |
| 2016/0294933 | A1* | 10/2016 | Hong ........................ G06F 9/00 |

* cited by examiner

*Primary Examiner* — Kwang B Yao
*Assistant Examiner* — Xuan Lu
(74) *Attorney, Agent, or Firm* — Troutman Pepper Hamilton Sanders LLP

(57) ABSTRACT

Technology related to disaggregating network traffic is disclosed. In one example, a method can include determining whether individual network flows are members within a first subset of the network flows. A second subset of the first subset of network flows can be learned in response to determining a change in a number of servers available to service the network flows. A first network packet can be forwarded to a first server in response to the first network packet being a member of the first subset of network flows and a member of the learned second subset of the first subset of network flows. A second network packet can be forwarded to a second server in response to the second network packet being a member of the first subset of network flows but not a member of the learned second subset of the first subset of network flows.

20 Claims, 9 Drawing Sheets

DISAGGREGATION OF NETWORK TRAFFIC

FIELD

This technology generally relates to network traffic management, and more specifically to distributing network traffic.

BACKGROUND

A software application can be distributed or partitioned across different computing devices. For example, a client-server architecture can partition tasks between a client device (such as a laptop or mobile device) and one or more server computers connected by an interconnection network (such as the Internet) and managed by a provider of computing service(s) and/or computing resource(s). The server computer(s) can execute software applications to provide virtual resources, software services, and/or content to the client devices. For example, client devices can initiate communication sessions with the server computers by sending requests over the interconnection network to the server computers, and the servers can respond to the requests. As the number of client devices seeking access to the server computers increases, intermediary computing devices, such as load balancer(s), can be added between the client devices and the server computers. A load balancer can distribute workloads from the clients across different server computers to potentially increase the scalability, availability, security, and/or performance of the client-server architecture. However, as the complexity of applications increases and the number of interconnected devices increases, there can be many challenges in implementing a high performance, highly available, and secure client-server architecture including a load balancer.

BRIEF SUMMARY

In one example, a method for disaggregating network flows is implemented in cooperation with a network traffic management system comprising one or more network traffic management modules, networking modules, or server modules. The method includes determining whether individual network flows are members within a first subset of the network flows. The membership of each network flow within a particular subset of the network flows can be based on one or more portions of a network packet of each network flow. A second subset of the first subset of network flows can be learned in response to determining a change in a number of servers available to service the network flows. A first network packet can be forwarded to a first server in response to the first network packet being a member of the first subset of network flows and a member of the learned second subset of the first subset of network flows. A second network packet can be forwarded to a second server in response to the second network packet being a member of the first subset of network flows but not a member of the learned second subset of the first subset of network flows. The second server can be different from the first server.

In another example, a system includes one or more network traffic management modules, networking modules, or server modules, memory comprising programmed instructions stored thereon, and one or more processors configured to be capable of executing the stored programmed instructions to determine whether individual network flows are members within a first subset of the network flows. The membership of each network flow within a particular subset of the network flows can be based on one or more portions of a network packet of each network flow. A second subset of the first subset of network flows can be learned in response to determining a change in a number of servers available to service the network flows. A first network packet can be forwarded to a first server in response to the first network packet being a member of the first subset of network flows and a member of the learned second subset of the first subset of network flows. A second network packet can be forwarded to a second server in response to the second network packet being a member of the first subset of network flows but not a member of the learned second subset of the first subset of network flows. The second server can be different from the first server.

In another example, a non-transitory computer readable medium having stored thereon instructions for disaggregating network traffic includes executable code that, when executed by one or more processors, causes the processors to determine whether individual network flows are members within a first subset of the network flows. The membership of each network flow within a particular subset of the network flows can be based on one or more portions of a network packet of each network flow. A second subset of the first subset of network flows can be learned in response to determining a change in a number of servers available to service the network flows. A first network packet can be forwarded to a first server in response to the first network packet being a member of the first subset of network flows and a member of the learned second subset of the first subset of network flows. A second network packet can be forwarded to a second server in response to the second network packet being a member of the first subset of network flows but not a member of the learned second subset of the first subset of network flows. The second server can be different from the first server.

In another example, a network traffic management apparatus includes memory including programmed instructions stored thereon and one or more processors configured to be capable of executing the stored programmed instructions to determine whether individual network flows are members within a first subset of the network flows. The membership of each network flow within a particular subset of the network flows can be based on one or more portions of a network packet of each network flow. A second subset of the first subset of network flows can be learned in response to determining a change in a number of servers available to service the network flows. A first network packet can be forwarded to a first server in response to the first network packet being a member of the first subset of network flows and a member of the learned second subset of the first subset of network flows. A second network packet can be forwarded to a second server in response to the second network packet being a member of the first subset of network flows but not a member of the learned second subset of the first subset of network flows. The second server can be different from the first server.

DETAILED DESCRIPTION

Overview

Figure 1:
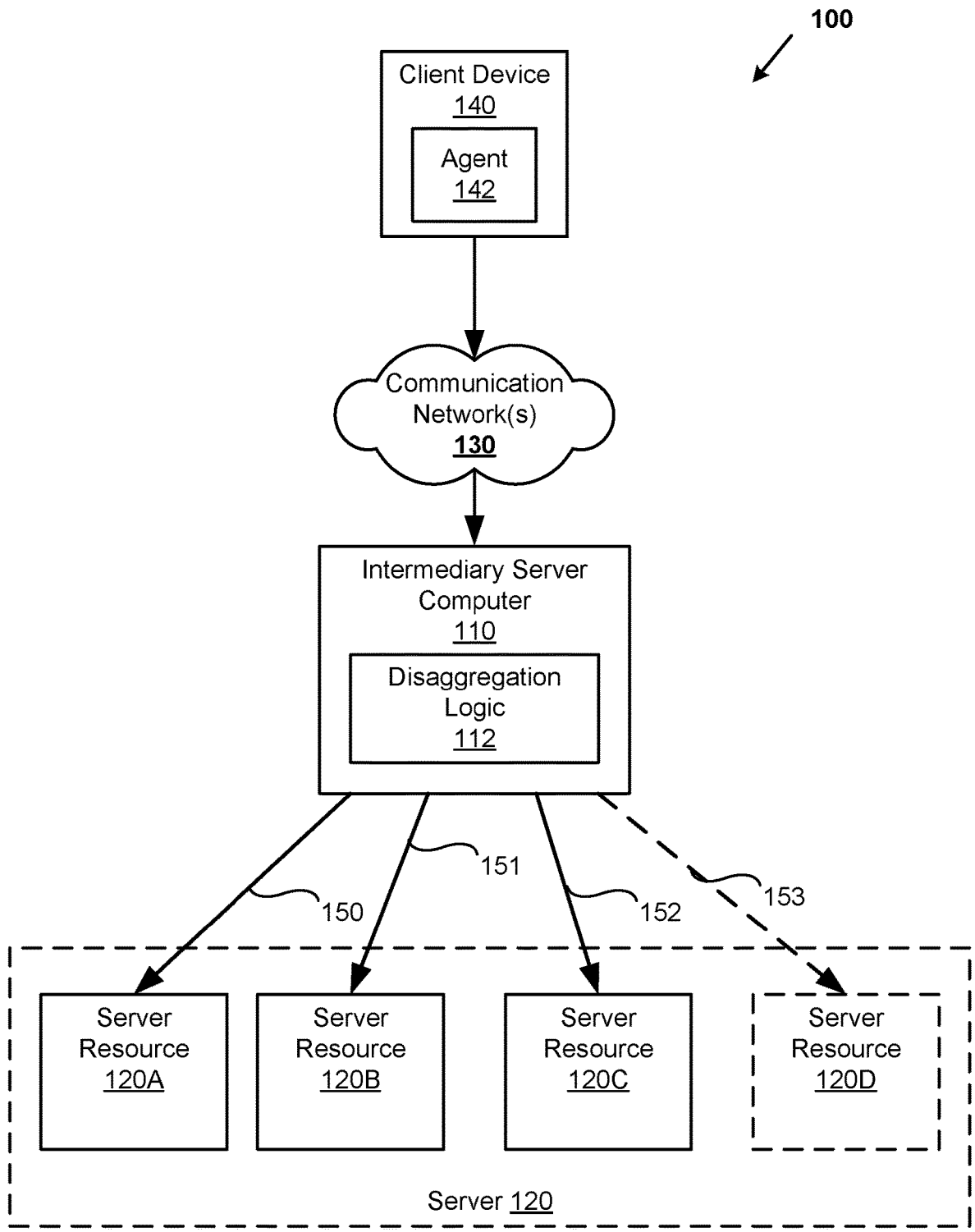
FIG. 1 is a block diagram of an example client-server architecture including an intermediary server computer including disaggregation logic.

As the number of client devices seeking access to a server computer increases, intermediary computing devices, such as load balancers, can be added between the client devices and the server computers to potentially increase the scalability, availability, security, and/or performance of a client-server architecture. A load balancer can include computer hardware and/or software for distributing workloads from many clients across different server computers. As one example, a load balancer can be application-neutral where it balances a network traffic load using networking techniques. Specifically, the load balancer can present a public network address to clients attempting to access the server, and when clients request access to connect to the server (using requests addressed to the public network address), the load balancer can forward the requests to a particular server at a private network address by performing network address translation (NAT). As another example, a load balancer can include software executed by a hypervisor that is running within a network-accessible computing environment (e.g., a private- or public-cloud computing environment). The load balancer can be executed as a virtual appliance (e.g., external to the server application) performing NAT or it can be integrated within the server application forwarding requests to different virtual instances of the server application.

A load balancer can enable server tasks to be parallelized by distributing or disaggregating network traffic workloads (e.g., requests) targeted to the server. The network traffic can include multiple network packets, where each network packet can be a request from a different client, for example. A disaggregation algorithm can be used by a load balancer to select a particular resource (e.g., a particular server computer or a network path) from among multiple resources to forward or process a particular network packet. The particular resource selected by the disaggregation algorithm can be selected based on a variety of factors, such as characteristics of a network packet, a history of packets processed by the different resources, a health of the different resources, a loading or utilization of the different resources, configurations (e.g., hardware and/or software components) of the different resources, and so forth.

A static disaggregation algorithm (DAG) can select a resource for processing a given network packet based on information within the network packet. For example, the static DAG can use packet header fields of the network packet, such as a source address, a source port, a destination address, a destination port, and/or a protocol identifier from a transmission control protocol over internet protocol (TCP/IP) packet to select a resource. Specifically, the packet header fields are encoded as values that can be used as an input to a function (e.g., a hash function or a modulus function) that transforms the input value to an output value that can be mapped to a particular resource. For example, a function that produces four different output values can be used to map a particular packet to one of four different resources. Specifically, a static DAG can use packet fields from a packet as input to the function to produce a value that maps to one of the four resources. The packet can be forwarded to the resource indicated by the static DAG. When the mix of packets and the characteristics of the function produce a relatively even distribution of output values, the network traffic can be relatively evenly distributed among the resources. A static DAG can be relatively efficient to implement because it is stateless.

A stateless algorithm is an algorithm that generates a result based on current information, such as an algorithm that processes a network packet based on input from the network packet. In contrast, a stateful algorithm (such as a stateful DAG) is an algorithm that generates a result based on information that is recorded before the algorithm is performed. The recorded information is referred to as state and the set of all states that are possible for a given system is referred to as the state space of a system. In the context of network traffic, examples of state can include histories of network packets seen within a previous time interval, histories of resources selected to process different types of packets, and so forth. The state can be recorded or stored in a computer-readable memory or storage so that the stateful algorithm can access the state to generate a result. As the state space is increased, the amount of memory or storage for holding the information of the system will also increase. Larger memories are generally slower than smaller memories and so the speed of calculating a stateful algorithm can decrease since processing time is used to access the stored state. Accordingly, a stateless algorithm can potentially process more requests in a given amount of time compared to a stateful algorithm.

Related network packets associated with relatively long-lived processing tasks may be better processed by a single resource, whereas unrelated packets associated with relatively simple or short-lived processing tasks can potentially be efficiently processed by many different resources. For example, connection-oriented communication protocols, such as TCP, are relatively long lived. Connection-oriented communication protocols set up a virtual connection between a source (e.g., the client) and a destination (e.g., the server resource) before sending data between the source and the destination. The connection is formed using a handshake of network packets between the source and the destination, and then data can be sent after the connection is formed. State about the connection is created when the connection is formed and the state is updated during the transmission of the data. The state about the connection can be stored at the destination so it is more efficient to process network packets associated with the connection at the same destination resource. Higher-level applications (e.g., hypertext transfer protocol (HTTP)) may utilize TCP or other connection-oriented communication protocols to provide continuity between the client and the server. As used herein, a network flow refers to a set of related network packets. For example, a network flow can include a set of TCP packets from a given source to a given destination. As another example, a network flow can include a set of packets that share common values for packet header fields including a source address, a source port, a destination address, a destination port, and/or a protocol identifier.

In contrast to connection-oriented communication protocols, connectionless communication protocols (such as user datagram protocol (UDP)) can send data without setting up a connection. Connectionless protocols can be used for both relatively simple or short-lived processing tasks and for relatively long-lived processing tasks. An example of a relatively short-lived higher-level processing task is a domain name system (DNS) lookup that generally uses UDP at the transport level.

An amount of network traffic (e.g., requests) targeting the servers can vary over time. During a period of higher demand, the number of network packets targeting the servers can be much greater than the number of network packets targeting the servers during a period of lower demand. A given server resource may have an upper bound on the number of requests that can be processed by the server resource. However, more requests can be serviced by adding more server resources. A server system designed to handle the peak demand for a server application can include a load balancer connected to multiple homogeneous server resources. The load balancer can distribute requests to the different server resources so that all requests can be processed. While this system may be capable of processing all requests during peak demand, the system may include more costly resources and consume more energy than a system designed for an average demand of the servers. Some example architectures, such as where the servers are implemented using an infrastructure as a service (IaaS) and/or software as a service (SaaS) model, can vary the number of server resources to match the demand of the servers. Reducing the number of servers can potentially reduce a cost of the service provider and/or reduce an energy consumption of the system. Increasing the number of servers can potentially enable a greater number of requests to be processed. Accordingly, it can be useful to have a load balancer that can adjust the number of server resources that process the network traffic.

However, changing the number of server resources to account for demand can potentially cause disruption to existing network traffic flows. For example, a load balancer can distribute the network traffic across the server resources using a static DAG that hashes on fields in the network packets. When the number of server resources is changed, the static DAG can reallocate existing flows handled by one server resource to a different server resource. The reallocation can cause the state associated with a particular network flow to be lost and/or difficult (e.g., resource-intensive) to locate and/or move to the new server resource. On the other hand, a load balancer can use a stateful DAG to distribute the network traffic across the server resources. A stateful DAG can be used to record the network flows associated with each of the server resources so that the number of network flows moved to different resources can be reduced. However, the state space for tracking which network flows are being processed by the different resources can be relatively large. For example, IP version six (IPv6) addresses can be 128 bits, so tracking network flows by the packet header fields including a source address, a source port, a destination address, a destination port, and a flow label can include storing over 300 bits per network flow. Accordingly, a stateful DAG can potentially use relatively large memories and can be slower to process network packets (e.g., to account for larger memory latencies) as compared to static DAGs.

As disclosed herein, a load balancer can use a hybrid DAG to potentially cause fewer existing flows to be reallocated, as compared to a static DAG, during a change in the number of server resources, and can potentially have increased processing speed and use fewer memory resources as compared to using a stateful DAG. For example, the hybrid DAG can divide or categorize the network traffic destined for a server into different subsets based on static information, such as the values of one or more packet fields within the headers of the network packets. One particular subset (referred to as the affected subset) of the network traffic can represent network flows that are statically mapped to one server resource before the number of server resources change and statically mapped to a different server resource after the change. During a steady-state or normal mode, such as before the number of server resources changes, the network traffic can be forwarded to the appropriate server resource based on static information (e.g., the one or more packet fields within the headers of the network packets). Network flows belonging to the affected subset can map to one or more entries in a consistent hash table.

A learning mode can begin when a change in a number of servers available to service the network flows is detected. For example, during increased demand, the number of server resources can increase from three server resources to four server resources. During the learning mode, network flows belonging to a smaller subset (also referred to as the learned subset) of the affected subset can be learned. The network flows belonging to the smaller subset can represent network flows that were set up using an existing server resource and where network packets continue to be exchanged with the server during the learning mode. In other words, the network flows of the smaller subset are the network flows that may be impacted by adding the new server resource because these are the network flows that, without intervention, could be moved from their existing server resource (where information about the network flow is stored) to the new server resource. The learning mode can last a little longer than a typical flow idle timeout for the specific service (e.g., a cloud-native service) performed by the server resources. Learning the smaller subset of network flows can include recording the respective disaggregation destinations (e.g., the existing server resources) of the network flows that meet the criteria of the smaller subset and that are detected during the learning period.

A draining mode can begin when the learning mode ends. During the draining mode, the learned flows of the smaller subset can be forwarded to the learned server resources and the other flows (e.g., new flows) of the affected subset can be forwarded to new server resources as indicated by a static DAG. Specifically, network packets of network flows belonging to both the affected subset and the learned subset can be forwarded to their learned server resource, and network packets of network flows belonging to the affected subset and not the learned subset can be forwarded to a different server resource (e.g., the new server resource). The learned network flows can be monitored so that flows that end during the draining mode can be removed from the learned subset. Specifically, a learned flow can be timed out (e.g., removed from the learned subset) if no packets from the learned flow are observed for that flow during a sweeping interval. The sweeping interval can be longer than a typical flow idle timeout for the specific service performed by the server resources. By not reallocating the learned flows to the new server resource until the flows have completed, the existing flows of the affected subset can be processed more efficiently since the state at the learned destination server resource can continue to be used without regenerating the state at the new server resource.

When all of the learned flows have drained, or when other criteria are met (such as when most or a threshold number of the learned flows have drained), the steady-state mode can begin. For services that process short-lived network flows, traffic disruption caused by changing the number of server resources can potentially be reduced to very low levels during service scaling. For services that process long-lived network flows, traffic disruption caused by changing the number of server resources can potentially be reduced to lower levels than using only a static DAG during service scaling.

Example Architectures for Disaggregating Network Traffic

FIG. 1 is a block diagram of an example client-server architecture 100, including an intermediary server 110, that can be used to perform a computing task that is distributed among different components of the client-server architecture 100. Specifically, FIG. 1 illustrates how disaggregation logic 112 of the intermediary server computer 110 can distribute network traffic to different server resources 120A-D of a server 120. The client-server architecture 100 can include the intermediary server computer 110, a server 120, communication network(s) 130, and a client device 140. The server 120 can include multiple resources, such as server resources 120A-D. The client-server architecture 100 can be implemented using a client-server architecture as described in more detail with reference to FIG. 8, where the different components (110, 120A-D, 130, 140) of the client-server architecture can be implemented using a computing environment as described in more detail with reference to FIG. 9.

The client device 140 and the server 120 can communicate via the communication network(s) 130 and the intermediary server computer 110. Specifically, requests from the client device 140 can be forwarded through the communication network(s) 130 and the intermediary server computer 110 to the server 120 using the communication channels 150-153. The client device 140 can be a computing device capable of sending network traffic over a communications network (e.g., network 130). For example, the client device 140 can be a mobile computing device, a desktop computing device, a laptop computing device, a tablet computing device, a virtual machine executing on a cloud-based computing environment, and so forth. The client device 140 can execute an agent 142 (e.g., a browser or other software application) that requests a service provided by the server 120. For example, the agent 142 can generate requests that are transmitted by the client device 140 using a connectionless communication protocol (e.g., UDP) or a connection-oriented communication protocol (e.g., TCP). A network flow can include the communications (e.g., the requests and the responses) between the agent 142 and the server 120. A particular network packet can be identified as belonging to a particular network flow using fields within a header of the network packet, such as a source address, a source port, a destination address, a destination port, and/or a protocol identifier field.

The server 120 can include multiple server resources 120A-D for processing requests from client devices, such as the client device 140. The number of server resources can be powered up, powered down, added to, or removed from the server 120 for a variety of reasons. For example, the server resources 120A-D can be scaled to match a demand or a power-envelope of the server 120. As illustrated, three server resources 120A-C can be available to meet a lower demand of the server 120, and a fourth server resource 120D can be made available to meet a higher demand of the server 120. The server resources 120A-D can include a variety of different computing and/or network resources. For example, the server resources 120A-D can include server computers, instances of server applications executing on a network-accessible computing infrastructure, routing resources within a multitier network traffic disaggregator, and/or other resources used to execute the server 120. The server resources 120A-D can execute a server software application, such as an HTTP server application or a secure shell (SSH) server application. Each of the server resources 120A-D can maintain state associated with the network flows that are processed by the respective server resources 120A-D.

The intermediary server computer 110 can act as a proxy for the server 120. A proxy is an agent that is situated in a path of communication between a client (e.g., the client device 140) and a server (e.g., the server 120) that can intercept communications (e.g., network packets, frames, datagrams, and messages) between the client and the server. The intermediary server computer 110 can perform various services, such as disaggregation, load balancing, rate monitoring, caching, encryption/decryption, address translation, and access control, for example. The intermediary server computer 110 can function as a virtual server that presents a network address of the proxy as the network address for the server 120. For example, the client device 140 can request a service of the server 120 by sending a request that is destined for one of the server resources 120A-D (e.g., using the network address of the virtual server as the destination address). The intermediary server computer 110 can intercept the request on behalf of the server 120. The intermediary server computer 110 can include disaggregation logic 112 used to determine which particular server resource of the server resources 120A-D will process the request. The intermediary server computer 110 can forward the request to the selected server resource 120A-D over one of the communication channels 150-153. Before forwarding, the proxy can modify the request from the client, such as by changing the destination address to be the network address of the selected server resource. The selected server resource can respond to the request from the client device 140 via the intermediary server computer 110. Specifically, the intermediary server computer 110 can intercept the response from the selected server resource and modify the response, such as by changing the source address of the response to be the network address of the virtual server. The response can then be forwarded to the client device 140.

Generally, the disaggregation logic 112 can disaggregate or spread out network traffic that is destined for the server 120. For example, the disaggregation logic 112 can potentially balance a processing and/or networking load of the different server resources 120A-D so that the server 120 can potentially respond to more requests from client devices compared to if the network traffic is not disaggregated. For a given network packet, the disaggregation logic 112 can select which one of the server resources will process the network packet. The selection can be based on a variety of factors, such as portions (e.g., fields) of the network packet, a mapping of the portions of the network packet to a subset of network flows, a state of the server 120, and/or a state of the network flows.

The disaggregation logic 112 can analyze fields within a packet header of the network packet to determine a network flow of the packet. The different network flows can be grouped into different subsets, and the network flows within a respective subset can be forwarded to a particular server resource. For example, the subsets can be determined based upon performing a hashing algorithm on the packet fields of the network packet. A hashing algorithm (also referred to as a hash function) can be used to transform an input value (also referred to as a key) to an output value (also referred to as a hash value or a hash) within a range of the hashing algorithm. For example, a hashing algorithm can be used to transform input values that fall within a larger range (e.g., a 300+ bit portion of the network packet) into hash values that fall within a smaller range (e.g., the number of values in a hash table). A hash value can be used to map the network packet to a particular subset of network flows, such as by using a hash table. A hash table is a data structure that is indexed by hash values and stores an associative mapping between the hash values and other value(s) of interest (such as value(s) representing: the subset of the network flow, a state of the subset, and/or the server resource(s) for processing the subset of the network flow).

The number of subsets of network flows can change based on changes to the system 100, such as when the number of active server resources of the server 120 are changed (e.g., increased or decreased). Using a consistent hash to map the hash values to the subsets can potentially reduce or eliminate a disruption of the network flows that can occur during changes to the number of server resources. A consistent hash uses a hash table with a greater number of hash values than mapped values (e.g., subsets or server resources). As one example, a consistent hash table can include a number of entries equal to a least common multiple (LCM) of the different numbers of mapped values that are possible. For example, if the system 100 supports the server 120 having as many as four active server resources (e.g., 120A-D), a consistent hash table can have twelve entries (the LCM of one, two, three, and four). As another example, if the system 100 supports the server 120 having as many as five active server resources (not shown), a consistent hash table can have sixty entries (the LCM of one, two, three, four, and five).

A given subset of network flows can correspond to one or more entries of a hash table. For example, all of the network flows that hash to the same hash value can be part of a given subset. The subsets can be further divided into smaller subsets based on additional criteria, such as a state associated with the subset of network flows and/or a history of the network flows. As one example, the states of a subset can include a steady-state state, a learning state, and a draining state. The steady-state state can represent a time when the disaggregation logic 112 can forward all of the network flows for the subset to the network resources 120A-D based on information contained within the packets of the subset of network flows. For example, the steady-state state can represent a time when the server resource for processing the packets of the network flows of the subset has not changed for a relatively long time. The learning state can represent a time when the disaggregation logic 112 is learning the network flows for the subset that occur within a learning period. Specifically, the disaggregation logic 112 can learn a smaller subset of the subset of network flows during the learning period, where the smaller subset can be the flows that are observed during the learning period. For example, the learning state can represent a time when the server resource for processing the packets of at least some of the network flows of the subset is changing. The draining state can represent a time when the disaggregation logic 112 is forwarding the network flows of the larger subset to different server resources. Specifically, the network flows of the smaller, learned subset can be forwarded to the same server resource that processed these flows before a change in the number of server resources, and the network flows of larger subset that are not in the smaller, learned subset can be forwarded to a server resource based on information contained within the packets of the subset of network flows. The states are described in more detail with reference to FIG. 3, the hash table is described in more detail with reference to FIG. 4, and disaggregation methods are described in more detail with reference to FIGS. 6-7.

It should be appreciated by one of ordinary skill in the art having the benefit of the present disclosure, that the communications channels 150-153 have been simplified for the ease of illustration. The communications channels 150-153 can be implemented using multiple networks and/or networking devices to interconnect the intermediary server computer 110 to the server 120. Furthermore, while configurations of three or four server resources are shown for server 120, it should be appreciated that different number of server resources are possible.

Figure 2:
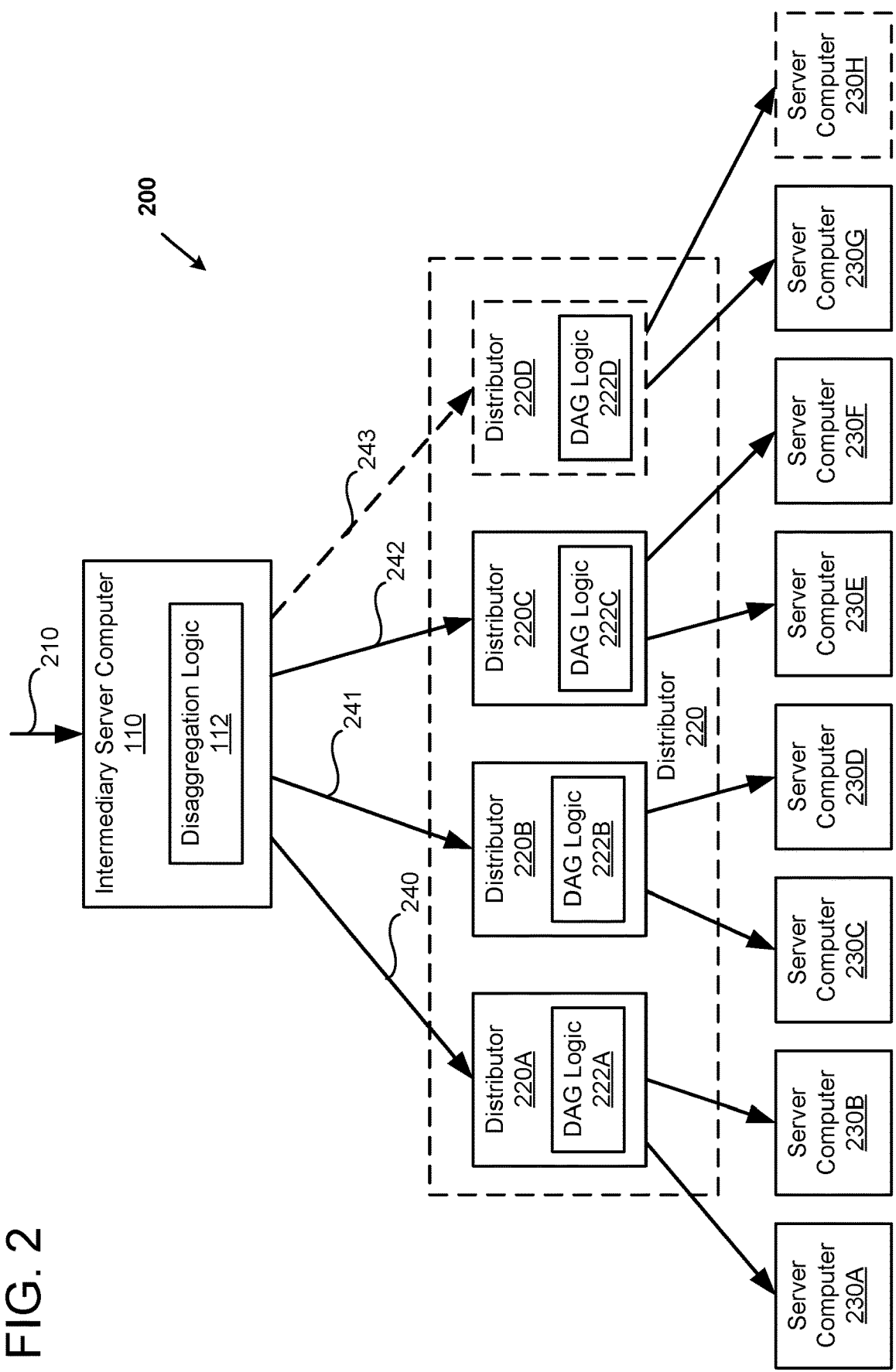
FIG. 2 is a block diagram of an example client-server architecture including a multi-tier load balancer including disaggregation logic.

FIG. 2 is a block diagram of an example client-server architecture 200, including an intermediary server 110, that can be used to perform a computing task that is distributed among different components of the client-server architecture 200. Specifically, FIG. 2 illustrates how disaggregation logic 112 of the intermediary server computer 110 can be used in a multi-tier architecture to distribute network traffic to different server computers 230A-H. The client-server architecture 200 can include the intermediary server computer 110, a distributor 220, communication channels 210 and 240-243, server computers 230A-H, and client devices (not shown). The client-server architecture 200 can be implemented using a client-server architecture as described in more detail with reference to FIG. 8, where the different components (110, 220A-D, 230A-H) of the client-server architecture can be implemented using a computing environment as described in more detail with reference to FIG. 9.

The intermediary server computer 110 can receive network traffic over the communication channel 210 from various client devices (not shown). As described herein, the disaggregation logic 112 can distribute the network traffic to various downstream networking and/or computing resources. For example, the downstream resources can include a distributor 220 and multiple server computers 230A-H.

The distributor 220 can include multiple smaller distributors 220A-D that can be scaled according to an amount of network traffic and/or other factors. As illustrated, the distributor 220 can use three distributors 220A-C during periods of lower demand and a fourth distributor 220D during a period of higher demand. As a specific example, the disaggregation logic 112 can forward a first subset of network flows through the channel 240 to the distributor 220A, a second subset of network flows through the channel 241 to the distributor 220B, and a third subset of network flows through the channel 242 to the distributor 220C. During a period of high demand, a fourth subset of network flows can be extracted from the other thee subsets of network flows so that the fourth subset of network flows can be forwarded through the channel 243 to the distributor 220D. When the demand becomes lower again, the distributor 220D can be gracefully removed with little to no disruption of network traffic.

Each of the distributors 220A-D can include a server computer and/or a router for receiving network traffic from the respective channels 240-243, and transmitting the network traffic to the respective server computers 230A-H. Each of the distributors 220A-D can include disaggregation (DAG) logic 222A-D which can perform the same or similar functions as the disaggregation logic 112. As a specific example, the DAG logic 222A can select network packets for routing to a specific server computer from the server computers 230A-B. The distributor 220A can forward the network packets arriving from the channel 240 to the selected server computer from the server computers 230A-B. A number of server computers used to process packets forwarded by the distributors 220A-D can be scaled based on an amount of network traffic flowing through a respective distributor 220A-D and/or based on other factors. As illustrated, the distributors 220A-C are forwarding traffic to two server computers and the distributor 220D is forwarding traffic to one server computer.

Using multiple tiers of distributors can potentially provide a more granular processing of the network traffic as compared to using a single tier of disaggregation logic. Additionally, using a hierarchy (e.g., multiple tiers) for disaggregating the network traffic to a smaller number of downstream neighbor devices can potentially reduce an amount of resources for performing the disaggregation as compared to using a single disaggregator.

It should be appreciated by one of ordinary skill in the art having the benefit of the present disclosure, that the communications channels 210, and 240-243 have been simplified for the ease of illustration. The communications channels 210, and 240-243 can be implemented using multiple networks and/or networking devices to interconnect the components of the client-server architecture 200. Furthermore, while configurations of three or four distributors are shown for distributor 220, it should be appreciated that different number of distributors are possible. Similarly, while the distributors are shown forwarding traffic to one or two server computers, it should be appreciated that it is possible for each of the distributors to forward traffic to a different number of server computers.

Figure 3:
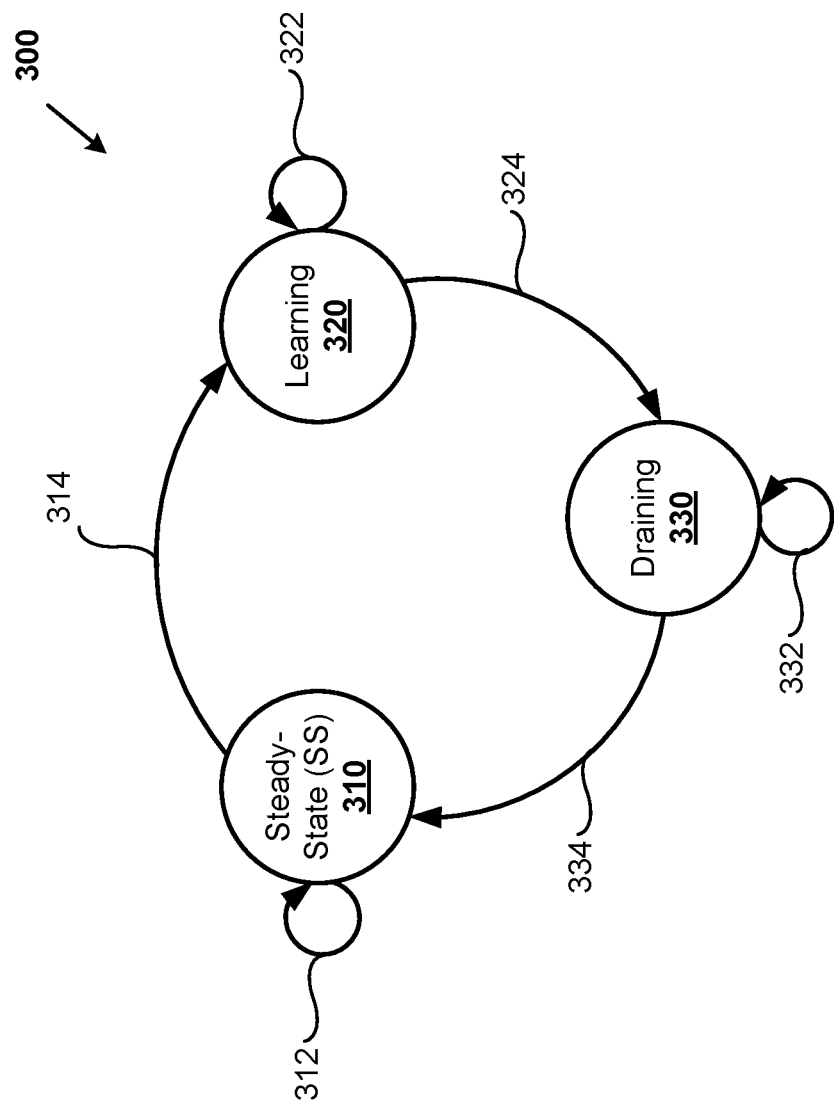
FIG. 3 illustrates an example state diagram used by disaggregation logic.

FIG. 3 illustrates an example state diagram 300 that can be used by disaggregation logic. A state diagram is a representation of operational states of a system and transitions that can occur between the different states of the system. As described herein, the different states of the state diagram 300 can be used by disaggregation logic (e.g., the disaggregation logic 112) to determine how to forward a network packet of a network flow. For example, the system described by the state diagram 300 can be the logic that is used to forward a subset of network flows, such as a subset of network flows that is associated with a given entry of a hash table.

The steady-state (SS) state 310 can be a default state of the system. For example, when a number of computing and/or networking resources for processing network packets is not changing, is not scheduled to change, and has not changed for a relatively long time, the system can be in the steady-state state 310. The transition 312 indicates that the system can remain in the steady-state state 310 until the transition 314 occurs. The transition 314 can occur when the number of computing and/or networking resources for processing network packets changes or is scheduled to change. For example, adding an additional server resource and/or distributor can cause the transition 314. Similarly, scheduling a server resource and/or distributor to be removed can cause the transition 314. The transition 314 results in the system entering the learning state 320. During the steady-state state 310, the disaggregation logic can forward packets according to a static algorithm based on information within the packets being forwarded.

The learning state 320 can be entered when a change in the number of processing resources occurs (e.g., a resource is added) or is scheduled to occur (e.g., a resource is scheduled for removal). For example, the learning state 320 can be entered when a change in the number of processing resources occurs and causes a static mapping of the resource to use for a given subset of network flows to change (e.g., the static mapping can change from an existing resource to a new resource). The transition 322 indicates that the system can remain in the learning state 320 for a period of time. For example, the system can remain in the learning state 320 until a learning period completes. The learning period can be set to about an idle timeout period (e.g., in the range of 90-110% of the idle time-out period) for one or more of the network flows of a subset of network flows. For example, an average or maximum round-trip time can be calculated for TCP packet flows and the learning period can be set to the round-trip time multiplied by scaling factor, where the scaling factor is greater than one. As another example, the learning period can be set to a predefined value, such as four minutes. During the learning state 320, the disaggregation logic can observe network flows that occur during the learning period. Some or all of the observed network flows can be recorded in a data structure that can be used during the draining state 330 to determine a target resource for the observed network flows. For example, the disaggregation logic can distinguish between long-lived flows (e.g., TCP) and short-lived flows (e.g., DNS lookup) and forward the network flows based on the length of the flows. In one embodiment, observed long-lived flows can be added to the data structure whereas observed short-lived flows may be omitted from the data structure. In another embodiment, both long-lived and short-lived flows can be added to the data structure. During the learning state 322, the disaggregation logic can forward packets to one or more resources. As one example, the disaggregation logic can continue forwarding all observed network flows to the existing resource (also referred to as the learned resource) during the learning state 320. As another example, the long-lived flows can continue to be forwarded to the existing resource and the short-lived flows can be forwarded to the new resource. The transition 324 indicates that the system can transition from the learning state 322 the draining state 330 at the expiration of the learning period.

The draining state 330 can be entered at the expiration of the learning period. During the draining state 330 learned network flows can be forwarded to a learned resource and unlearned network flows can be forwarded to a resource based on information contained within a network packet of the network flow. Here, learned network flows refer to the network flows that were observed during the learning period and were recorded in the learned flow data structure, and unlearned network flows refer to the network flows that were not recorded in the learned flow data structure. During the draining state 330, the learned network flows can be monitored so that flows that time-out or end during the draining state can be removed from the learned data structure. Specifically, a learned flow can be timed out and removed from the learned data structure if no packets from the learned flow are observed for that flow during a sweeping interval. The sweeping interval can be set to about a typical flow idle timeout (e.g., 90-110% of the timeout period) for the specific service performed by the server resources. The learned flows can continue to be removed from the learned flow data structure as they timeout until there are no learned flows left. Additionally or alternatively, the learned flow data structure can be emptied at a predefined time interval, such as ten or twenty seconds or minutes after the number of resources had changed. The transition 332 indicates that the system can remain in the draining state 330 while the learned flow data structure has valid entries. The transition 334 indicates that the system can transition from the draining state 330 to the steady-state state 310 when the learned flow data structure has no more valid entries and/or when the predefined time interval has expired. For a resource that was scheduled to be removed, the resource can be removed when all flows to the resource have transitioned from the draining state 330 to the steady-state state 310.

Figure 4:
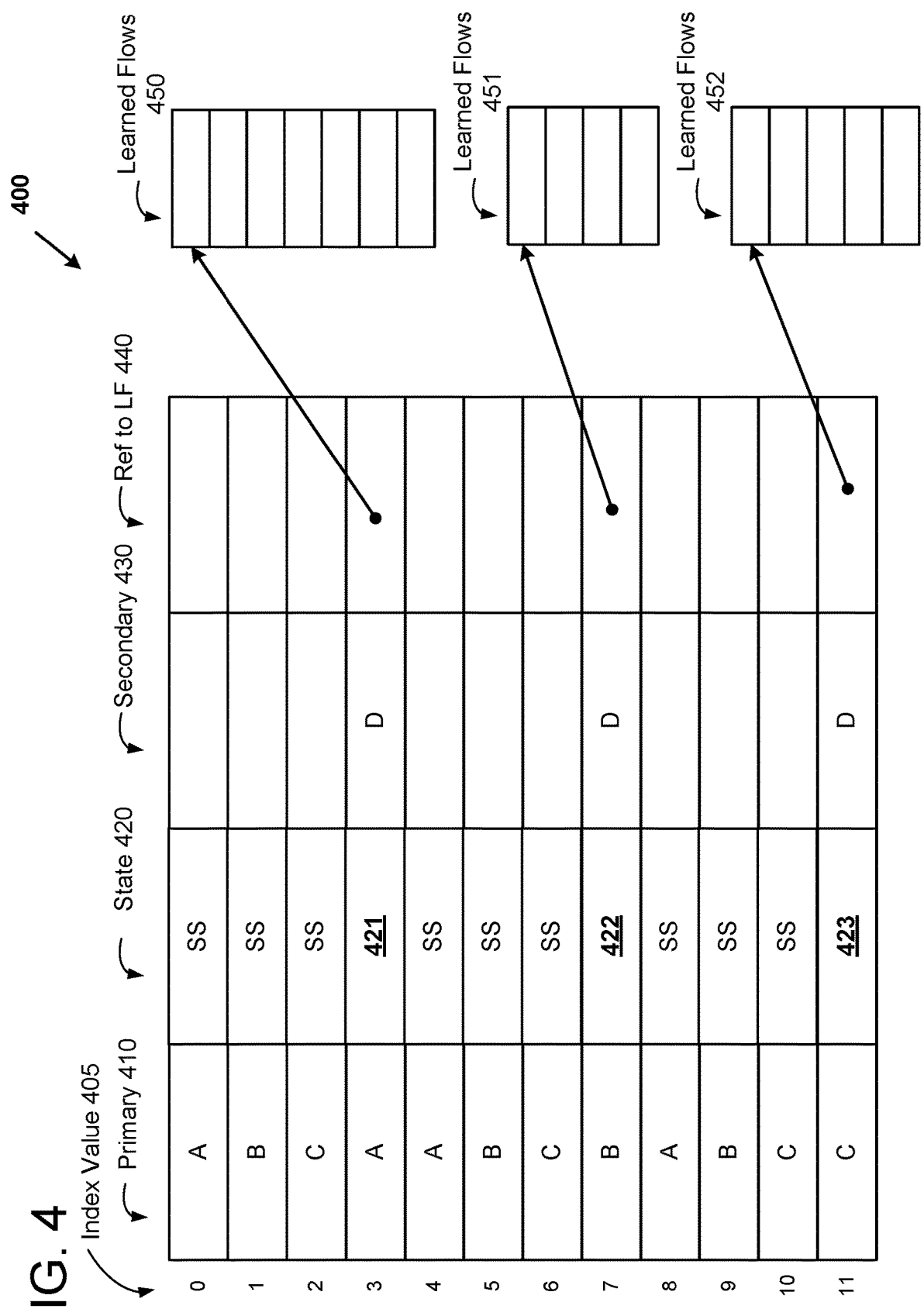
FIG. 4 is a block diagram of an example data structure for disaggregation logic.

FIG. 4 is a block diagram of an example data structure 400 that can be used by disaggregation logic. A data structure is an organization for data that is stored in a computer-readable memory and that can be accessed by computer logic (e.g., software, hardware, and/or combinations thereof) during execution of the computer logic.

The data structure 400 can be organized as a table (e.g., a hash table), where a row of the table is referred to as an entry and columns of the table can be used to store different values within the respective entries. The entries can be identified using the index values 405 which are labeled 0-11. For example, each of the entries can correspond to a different subset of network flows. Specifically, each of the index values 405 can correspond to a different value produced by a hash function. Fields of a network packet can be used as an input to the hash function to produce an output that corresponds to one of the index values 405. As illustrated, the network traffic can be subdivided into twelve different subsets of network flows which can be further subdivided, as described herein.

Each of the entries can include multiple values representing different quantities used by the disaggregation logic. For example, the primary resource column 410 can be used to identify a primary path and/or resource to use for processing network flows of the subset. Specifically, the primary resource column 410 can indicate a primary resource for the subset of network flows to use during the steady-state (SS) state and/or the learning state. The state column 420 can be used to identify a state of the disaggregation logic associated with the subset of network flows. As described above, the states can be the steady-state, learning, and draining states. The secondary resource column 430 can be used to identify a secondary resource for a learned subset of the subset of network flows to use during the draining state and/or the learning state. The reference to learned flows (LF) column 440 can be used to reference one or more additional data structures (e.g., the learned flows data structures 450-452) that store a representation of the flows that are learned during the learning period. Alternatively (not shown), the representation of the flows that are learned during the learning period can be stored within the data structure 400. Some of the columns may not be used during some states for a given entry.

As a specific example, the data structure 400 can be configured to operate in a system that can disaggregate traffic to either three or four computing and/or networking resources (such as the systems 100 and 200 of FIGS. 1 and 2). When the system has been operating with three resources for a relatively long time, all of the network flows can be in the steady-state operational state and all values in the state column 420 can represent the steady-state state, including the values 421-423. To divide the network traffic approximately evenly among the three different resources (e.g., the server resources 120A-C or the distributors 220A-C), a representation of the resources can be evenly distributed and the primary resource column 410 among the different entries of the data structure 400. For example, one third of the entries (0, 3, 4, 8) use resource A as the primary resource; one third of the entries (1, 5, 7, 9) use resource B as the primary resource; and one third of the entries (2, 6, 10, 11) use resource C as the primary resource. During the steady-state state with three resources, network flows having hash values of 0, 3, 4, or 8 will be processed by resource A (e.g., server resource 120A or distributor 220A), network flows having hash values of 1, 5, 7, or 9 will be processed by resource B, network flows having hash values of 2, 6, 10, or 11 will be processed by resource C. As the amount of network traffic increases and the loading on the resources increases, a fourth resource (e.g., server resource 120D or distributor 220D) can be added.

When the fourth resource is added, some of the network flows can be transitioned to using the fourth resource. For example, entries 3, 7, and 11 can enable the transition for their corresponding network flows to use the new resource by changing the values 421-423 to represent the learning state. Additionally, the secondary resource column 430 can be populated with a value representing resource D for the entries 3, 7, and 11. During the learning state, observed network flows can be learned, and a representation of the observed network flows can be stored in the respective learned flows data structures 450-452. A reference (e.g., a pointer) to the learned flows data structures can be populated in the reference to learned flow column 440 for the entries 3, 7, and 11. The respective learned flow data structures 450-452 can be updated as new network flows are observed during the learning state.

The learned flow data structures 450-452 can be configured in a variety of different ways. As one example, identifying fields of the network packets of the observed network flows can be stored in a table of the respective learned flow data structure 450-452. However, the identifying fields can be relatively large (e.g., greater than 300 bits) and so processing such a table may use a relatively large number of computing resources. As another example, one or more Bloom filters can be used to store a representation of the learned network flows.

A Bloom filter is a probabilistic data structure that can be used to determine whether a value is stored within the Bloom filter. The Bloom filter can use multiple (e.g., two) hash functions to map a given value to entries of the Bloom filter. The Bloom filter includes an array of bits, where each of the bits represents a value within the range of the hash functions. An empty Bloom filter containing no values can have all of the bits in the array of bits cleared or set to zero. To add a new value to the Bloom filter, the new value is used as input to the different hash functions to produce different output values corresponding to bits within the array of bits, which are set when the new value is added to the Bloom filter. As a specific example, if two hash functions of a Bloom filter generate hash values in the range of 0-1023, and a new value to be added to the Bloom filter produces hash values of 17 and 98, then bits 17 and 98 of the bit array can be set (e.g., made a value of one) to indicate that the new value has been added to the Bloom filter. To determine whether a test value has been added to a Bloom filter, the test value can be used as input to the different hash functions to produce different output values corresponding to bits within the array bits. If all of the corresponding bits are set, the test value has been previously stored in the Bloom filter, but if any of the corresponding bits are not set, the test value has not been previously stored in the Bloom filter. Using a Bloom filter can potentially reduce an amount of computing resources that are used to determine whether a value has been learned.

After the learning state ends, the draining state can begin, and the values 421-423 can be changed to represent the draining state. When a network flow corresponding to the entries 3, 7, and 11 is observed during the draining state, the network flow can be forwarded to either the primary resource or the secondary resource based on whether the network flow was learned during the learning period. Specifically, identifying fields of the network flow can be compared directly to identifying fields of the learned flows or the identifying fields of the network flow can be looked up using a Bloom filter to determine whether the network flow is a learned flow. If the network flow is not a learned flow, the network flow can be forwarded to the secondary resource (e.g., the resource D) as indicated by the secondary resource column 430. If the network flow is a learned flow, the network flow can be forwarded to the primary resource as indicated by the primary resource column 410. Thus, the subset of network flows corresponding to a given entry of the data structure 400 can be further divided into a subset of learned flows and a subset of unlearned flows, and the different subsets (learned and unlearned) of the subset of the network flows can be routed accordingly.

The learned flows data structures 450-452 can be updated during the draining state. Specifically, learned flows that are not observed during a sweeping interval can be removed from the learned flows data structures 450-452. As one example, a new empty Bloom filter can be generated at the beginning of the sweeping interval and learned flows that are observed during the sweeping interval can be added to the new Bloom filter. At the end of the sweeping interval, the new Bloom filter can be used to replace the original Bloom filter. As another example, instead of using a single bit for each entry of the Bloom filter, multiple bits (e.g., two bits) can be used. When a flow is observed, the entries corresponding to the observed flow can be set to a maximum value (e.g., 3) of the entry. At the beginning of the sweeping interval, all of the nonzero values can be decremented. A network flow can be present in the Bloom filter when all of the values corresponding to the network flow have nonzero values. On the other hand, the network flow can be absent if any of the values corresponding to the network flow are zero. When all of the learned flows have been removed from a respective learned flow data structure 450-452 and/or when other criterion have been met, the draining state can end and the entry of the data structure 400 can return to the steady-state state. As a specific example, when the learned flows data structure 451 is emptied, the value 422 can be changed to reflect a steady-state and the value representative of the secondary resource (e.g., the resource D) can be copied to the primary resource column 410 so that all network flows corresponding to the entry 7 can be routed to the resource D.

This process can be reversed if the network traffic is reduced and/or the loading on the server resources is reduced. For example, the distributor D can be scheduled for removal when the network traffic is reduced. Scheduling the distributor D for removal can cause the states 421, 422, and 423 to transition to the learning state, where flows to distributor D can be learned. Specifically, network flows corresponding to the entries 3, 7, and 11 can be learned during the learning state. After the learning period, the states 421, 422, and 423 can transition to the draining state. When a network flow corresponding to the entries 3, 7, and 11 is observed during the draining state, the network flow can be forwarded to either the primary resource (e.g., resource D) or the secondary resource (e.g., resources A, B, and C for the network flows corresponding to the entries 3, 7, and 11, respectively) based on whether the network flow was learned during the learning period. As all of the learned network flows corresponding to the entries 3, 7, and 11 drain, the states 421, 422, and 423 can transition to the steady-state state and the primary resource can be returned to the A, B, and C resources for the entries 3, 7, and 11, respectively.

It should be appreciated by one of ordinary skill in the art having the benefit of the present disclosure, that while the data structure 400 includes twelve entries, different numbers of entries are possible. For example, the data structure 400 can include a number of entries that match a number of values for a consistent hash for a number of server resources.

Figure 5:
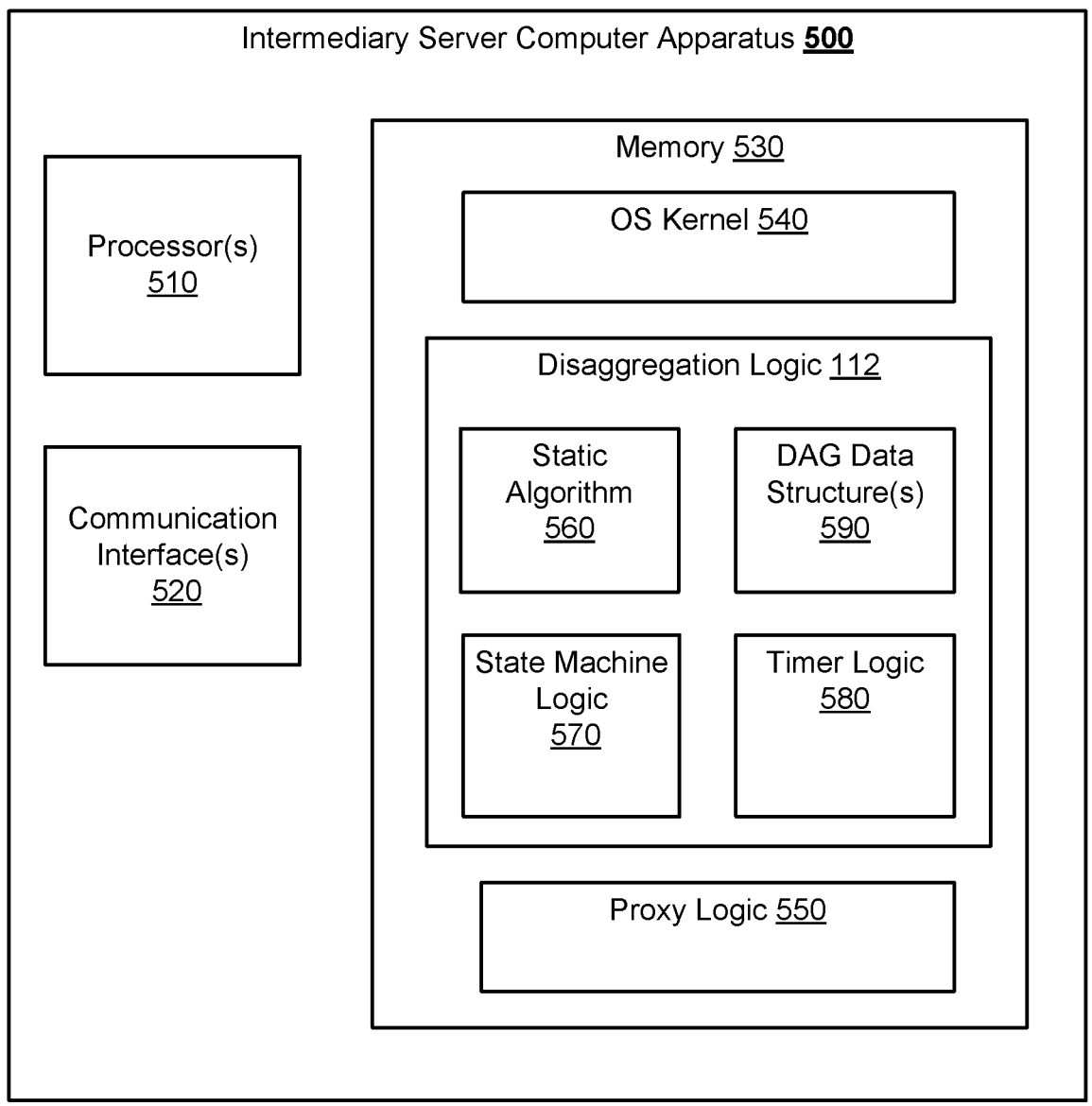
FIG. 5 is a block diagram of an example intermediary server computer apparatus including disaggregation logic.

FIG. 5 is a block diagram of an example intermediary server computer apparatus 500 including disaggregation logic 112. For example, the intermediary server computer apparatus 500 can be a load balancer, an application delivery controller, a network traffic management system, or another component configured to be in a communication path between a client and a server of a client-server architecture. The intermediary server computer apparatus 500 can be implemented using a computing environment as described in more detail with reference to FIG. 9.

The intermediary server computer apparatus 500 can include one or more processor(s) 510, one or more communication interface(s) 520, and memory 530. The processor 510, communication interface 520, and the memory 530 can be coupled together with an interconnect (not shown) so that the components of the computer apparatus 500 can communicate with each other using the interconnect. The communication interface 520 can be used to send and receive communications (e.g., network packets) with other computing devices, such as a client and a server. The processor 510 can be used to execute computer-executable instructions that are stored in the memory 530 and/or storage resources (not shown). The computer-executable instructions can be organized into software routines (also referred to as modules or components) comprising executable code to perform various computing tasks. It should be noted that while FIG. 5 illustrates one organization of routines, other organizations are possible. For example, the illustrated routines can be sub-divided into smaller routines and/or combined into larger routines. The memory 530 can also include structured and/or unstructured data that is used by the software routines to perform the computing tasks.

The operating system (OS) kernel 540 can include different software routines for managing different aspects of the execution of programs and for interfacing with the hardware of the intermediary server computer apparatus 500. For example, the OS kernel 540 can manage the loading and removal of software applications and other routines into the memory 530 of the computer apparatus 500; the OS kernel 540 can manage storage resources of the computer apparatus 500; the OS kernel 540 can manage processes and/or threads executing on the processor 510; the OS kernel 540 can manage power states of the computer apparatus 500; the OS kernel 540 can provide an interface for applications and other routines to send and receive communications (e.g., network packets) using the communications interface 520; and the OS kernel 540 can enable inter-process communication between different routines executing on the computer apparatus 500.

The proxy logic 550 can include software routines for performing functions of a proxy server. For example, the proxy logic 550 can present a public network address for the server (in conjunction with the OS kernel 540 and the communications interface(s) 520) and perform address translation for packets destined for the server. The proxy logic 550 can communicate with the disaggregation logic 112 to determine a private network address or a network path for the respective network packets that are destined for the server. Specifically, the computing or network resource selected by the disaggregation logic 112 can be mapped to a private address or a network path so that the network packets can be forwarded to the appropriate computing or network resource. The proxy logic 550 can perform address translation for packets originated at the server and destined for a client. Specifically, the proxy logic 550 can modify a source address of the network packets from the private network address of the individual server resources to the public network address of the server. The modified packets can be forwarded to the client.

The disaggregation logic 112 can include software routines for distributing the network traffic intercepted by the intermediary server computer apparatus 500 and destined for the server. For example, the disaggregation logic 112 can include a static algorithm 560, state machine logic 570, timer logic 580, and disaggregation (DAG) data structure(s) 590. The static algorithm 560 can be used to classify or categorize network packets into subsets of network flows using information within the network packets. For example, a network packet can be classified based on fields within a packet header of the network packet. The fields can be from different layers of the Open Systems Interconnection (OSI) model or another model. Example fields that can be used include a source address, a destination address, a source port, a destination port, a protocol identifier, a flow label, or any other field than can identify a source, destination, or application of the packet. The state machine logic 570 can include routines for determining transitions and tracking operational states of the disaggregation logic 112 for the different subsets of network flows. For example, the state machine logic 570 can include routines for tracking state as described above with reference to FIGS. 3 and 4. The timer logic 580 can include routines for initiating timers and tracking the status of those timers. For example, the timer logic 580 can initiate a learning period timer when a change in the number of server resources is detected, and the timer logic 580 can determine when the learning period is complete. The timer logic 580 can initiate a sweeping interval timer during a draining state, and the timer logic 580 can determine when the sweeping interval is complete. Timers can be maintained for the network traffic and/or for individual subsets of the network flows. The DAG data structure(s) 590 can include routines for tracking state that is used by the disaggregation logic 112 to select destinations for the different network flows. Example DAG data structures are described above with reference to FIG. 4.

It should be appreciated by one of ordinary skill in the art having the benefit of the present disclosure, that while the disaggregation logic 112 and the proxy logic 550 are described as software routines executed by a processor, the functions of the routines can also be performed using programmable and/or special-purpose hardware, such as by using the logic circuitry within a field-programmable gate-array (FPGA) or an application-specific integrated circuit (ASIC).

Example Methods for Disaggregating Network Traffic

Figure 6:
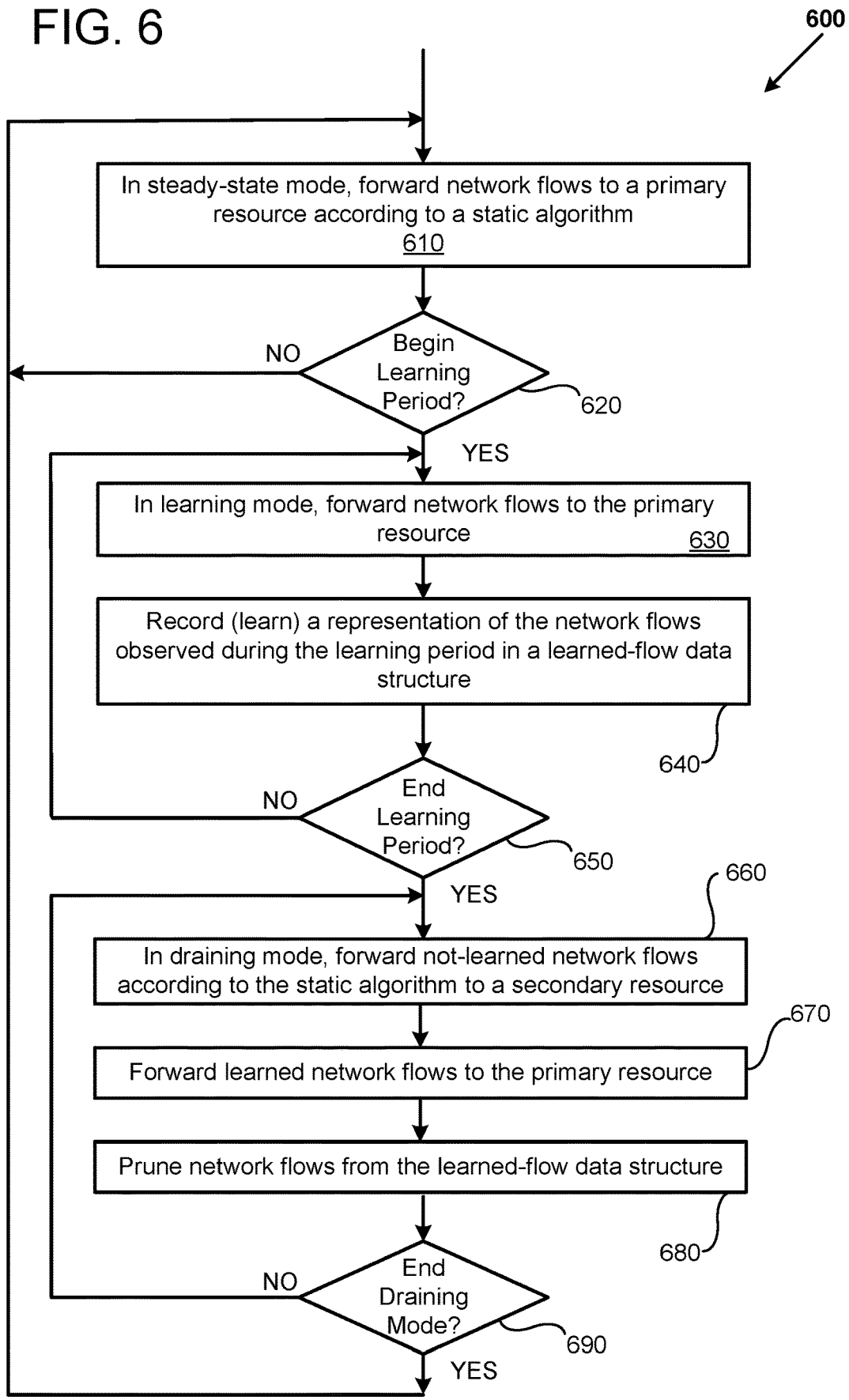
FIG. 6 is a flowchart of an example method of disaggregating network flows.

FIG. 6 is a flow diagram of an example method 600 of disaggregating network flows. For example, the method 600 can be implemented by the intermediary server computers 110 and 500, such as described above in reference to FIGS. 1-5. For example, computer-executable instructions for carrying out the method 600 can be stored in a computer-readable memory of the intermediary server computer, and the instructions can be executed by a processor of the intermediary server computer to perform the method 600.

At 610, network flows can be forwarded to a primary resource according to a static algorithm during a steady-state mode. The static algorithm can be an algorithm that uses packet fields within a respective network packet to generate an output. For example, the static algorithm can be a hash function that uses flow-identifying information from a respective packet as an input to generate a hash value within a range of values that are used as indices to a hash table. The flow-identifying information can be a source address, a destination address, a source port, a destination port, a protocol identifier, and/or a flow label, for example. The hash table can store a network address or a reference to the primary resource or to an intermediate resource in the path of the primary resource. A final or intermediate destination of a given packet can be determined by inputting the flow-identifying information of the packet into the static algorithm to generate a hash value that is used to look up the address or reference to the primary resource or the intermediate resource in the path of the primary resource. The final or intermediate destination can be used to forward the packet toward the primary resource. The primary resource can be a server computer, a network device, a software application executing in a cloud-based environment, or another hardware or software resource for processing and/or forwarding network packets.

At 620, it can be determined whether a learning period has started. For example, the learning period can begin in response to detecting that a number of resources available for processing network packets has changed. For example, the number of resources available for processing network packets changes when a resource is added or when a resource is scheduled to be removed. If the learning period does not begin, then the method 600 can continue at 610. If the learning period is beginning, the method 600 can continue at 630.

At 630, network flows can be forwarded to the primary resource during a learning mode. As one example, long-lived network flows can be forwarded to the primary resource during a learning mode. Long-lived network flows can include connectionless or connection-oriented flows. For example, long-lived network flows can include UDP and TCP flows. By continuing to forward long-lived network flows to the primary resource, the long-lived network flows can potentially continue with less disruption than if the long-lived network flows were forwarded to a different resource. As another example, both long-lived and short-lived network flows can be forwarded to the primary resource during the learning mode.

At 640, a representation of the long-lived and/or short-lived network flows that are observed during the learning period can be recorded in a learned-flow data structure. For example, the representation of the observed or learned network flows can be extracted packet fields from the network flows. As another example, the representation of the observed network flows can be the output(s) of one or more has functions used in a Bloom filter. The representation of the observed network flows can be stored in a learned-flow data structure, such as a table of the extracted packet fields or one or more Bloom filters.

At 650, it can be determined whether the learning period is complete. For example, the learning period can continue for an interval lasting about as long a timeout period for a typical long-lived flow. If the learning period is not complete, then the method 600 can continue at 630. If the learning period is complete, the method 600 can continue at 660.

At 660, not-learned network flows can be forwarded according to the static algorithm to a secondary resource during a draining mode. The not-learned network flows are network flows that do not have representations stored within the learned-flow data structure. The static algorithm can use flow-identifying information from a respective packet of a not-learned network flow as an input to generate a hash value used as an index to the hash table. The hash table can store a network address or a reference to the secondary resource or to an intermediate resource in the path of the secondary resource. A final or intermediate destination of a given packet can be determined by inputting the flow-identifying information of the packet into the static algorithm to generate a hash value that is used to look up the address or reference to the secondary resource or the intermediate resource in the path of the secondary resource. The final or intermediate destination can be used to forward the packet toward the secondary resource. The secondary resource can be a server computer, a network device, a software application executing any cloud-based environment, or another hardware or software resource for processing and/or forwarding network packets. For example, the secondary resource can be configured identically or similarly to the primary resource such that the primary and secondary resources can perform the same or similar processing functions for the network flows. The secondary resource can be a resource that is added or powered up in response to various criteria, such as an increase in demand of a server.

At 670, the learned network flows can be forwarded to the primary resource during the draining mode. The learned network flows are the network flows that have representations stored within the learned-flow data structure. As described above at 610, for a given network packet of a network flow, the static algorithm can be used to generate an index into the hash table, so a reference to the primary resource or to an intermediate resource in the path of the primary resource can be determined and the packet can be forwarded to the primary resource.

At 680, the network flows from the learned-flow data structure can be pruned during the draining mode. For example, network flows that are not observed during a sweeping interval can be removed from the learned-flow data structure. As one example, pruning can occur by keeping multiple copies of a Bloom filter, where one copy can store representations of observed network flows prior to beginning a sweeping interval, and a second copy can store representations of observed network flows during the sweeping interval. At the end of the sweeping interval, the second copy replace the first copy and the process can begin again for a new sweeping interval.

At 690, it can be determined whether the draining mode is complete. For example, the draining mode can complete when there are no more network flows identified by the learned-flow data structure. As another example, the draining mode can complete when a predefined time-period has elapsed. As another example, the draining mode can complete when a predefined number or percentage of the original learned network flows remain in the learned-flow data structure. When the draining mode is not complete, the method 600 can continue at 660. When the draining mode is complete, the steady-state mode can begin, and the method 600 can continue at 610.

Figure 7:
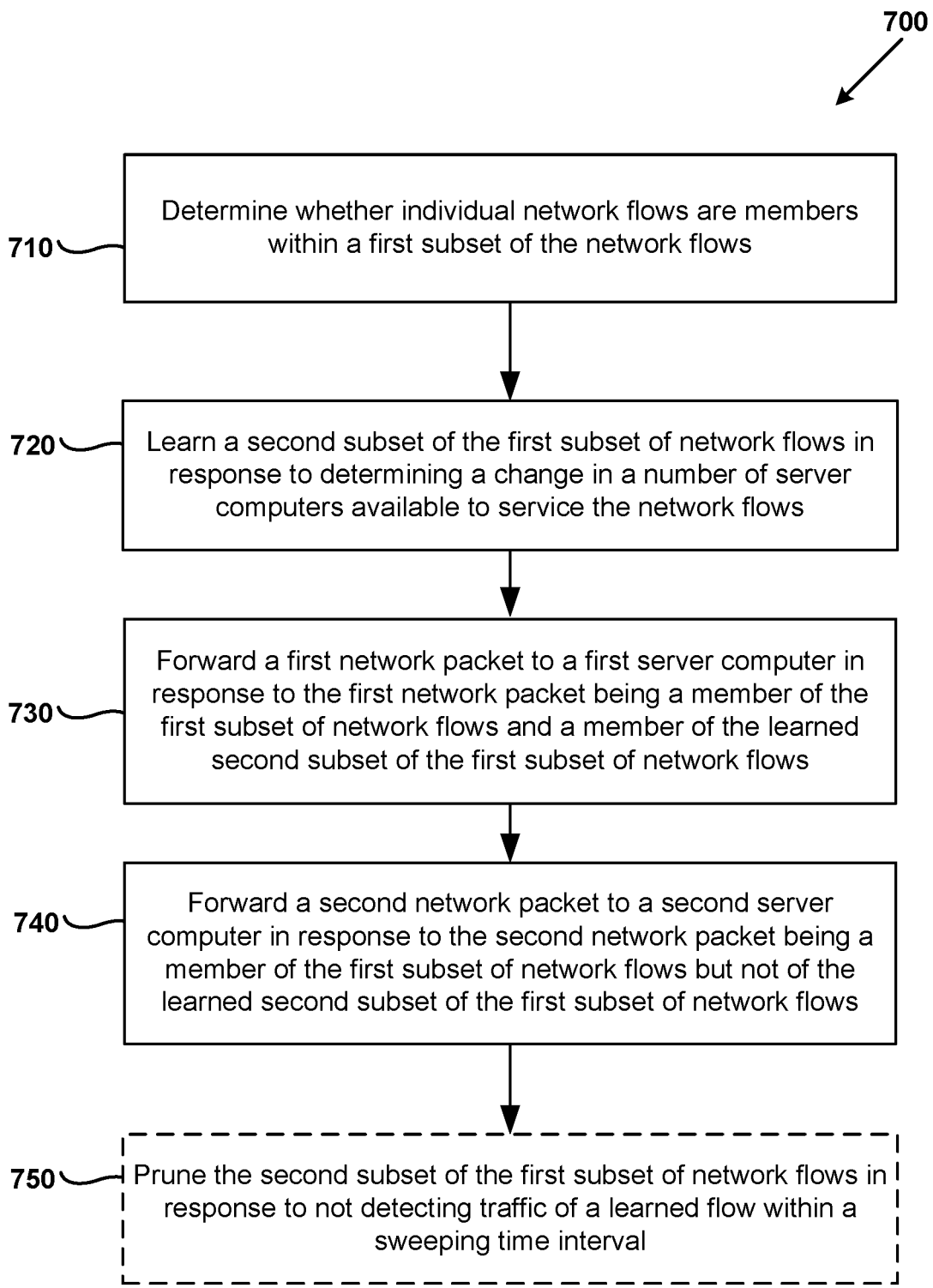
FIG. 7 is a flowchart of an example method of disaggregating network flows.

FIG. 7 is a flow diagram of an example method 700 of disaggregating network flows. For example, the method 700 can be implemented by the intermediary server computers 110 and 500, such as described above in reference to FIGS. 1-6. For example, computer-executable instructions for carrying out the method 700 can be stored in a computer-readable memory of the intermediary server computer, and the instructions can be executed by a processor of the intermediary server computer to perform the method 700.

At 710, it can be determined whether individual network flows are members within a first subset of the network flows. The membership of each network flow within a particular subset of the network flows can be based on one or more portions of a network packet of each network flow. For example, the one or more portions of the network packet can be flow-identifying fields within headers of the network packets, such as a source address, a destination address, a source port, a destination port, a protocol identifier, and/or a flow label. Determining the membership of individual network packets can include determining a hash value of the one or more portions of each network packet. The hash value can be used to map each network packet to a particular subset of the network flows. For example, the first subset of the network flows can include all of the network flows that cause a hash function to produce a given hash value. The hash value can be used as an index for a hash table data structure that can store information about the first subset of network flows in an entry of the hash table. For example, the hash table entry can be used to store a primary resource, a state of the disaggregation logic for the first subset of network flows, a secondary resource, and a representation of learned network flows or a reference to the representation of learned network flows.

At 720, a second subset of the first subset of network flows can be learned in response to determining a change in a number of servers available to service the network flows. The number of resources available to service network packets can change when a resource is added or when a resource is scheduled to be removed. For example, the number of servers servicing the network flows can be changed in response to a change in demand for the servers or based on other criteria. The learned second subset of the first subset of network flows can be learned during a learning period. The learning period can be a time period beginning after the number of servers servicing the set of network flows has changed and ending after a time-out period of at least one of the network flows. The learned second subset of the first subset of network flows can include network flows that are observed during the learning period. For example, the learned second subset of the first subset of network flows can include long-lived network flows (e.g., TCP) that are observed during the learning period. Representations of the learned second subset of the first subset of network flows can be stored in the hash table data structure or a data structure referenced by the hash table data structure. For example, the representations of the learned second subset can be the one or more portions of the network packets belonging to the learned second subset. As another example, the representations of the learned second subset can be one or more Bloom filters that have added the packets of the learned second subset to its dataset.

At 730, a first network packet can be forwarded to a first server in response to the first network packet being a member of the first subset of network flows and a member of the learned second subset of the first subset of network flows. For example, the first server can be a server that was operational to process network flows before the number of servers servicing the network flows changed. During a draining mode, one or more portions of the first network packet can be used as an input to the hash function to generate a hash value corresponding to the first subset of network flows. A representation of the first network packet can be compared against the representations of the learned second subset of the first subset of network flows that are stored in the hash table data structure or in a data structure referenced by the hash table data structure. If the representation of the first network packet is present in the learned second subset of the first subset of network flows, then the first network packet can be forwarded to the first server. A learned flow can be removed from the learned second subset in response to not detecting traffic of the learned flow within a sweeping time interval.

At 740, a second network packet can be forwarded to a second server in response to the second network packet being a member of the first subset of network flows but not of the learned second subset of the first subset of network flows. The second server is different from the first server. For example, the second server can be a server that was added to process network flows when the number of servers servicing the network flows changed. During the draining mode, one or more portions of the second network packet can be used as an input to the hash function to generate a hash value corresponding to the first subset of network flows. A representation of the second network packet can be compared against the representations of the learned second subset of the first subset of network flows that are stored in the hash table data structure or in a data structure referenced by the hash table data structure. If the representation of the first network packet is not present in the learned second subset of the first subset of network flows, then the second network packet can be forwarded to the second server.

At 750, the second subset of the first subset of network flows can optionally be pruned in response to not detecting traffic of a learned flow within a sweeping time interval. Specifically, the learned flow can be removed from the learned second subset in response to not detecting traffic of the learned flow within a sweeping time interval. The second subset of network flows can be emptied in response to an occurrence of a threshold event, such as by removing the last learned flow from the learned second subset or the expiration of a timer. When the second subset of network flows is emptied, all network flows within the first subset can be forwarded to the second server.

Example Computing Environments

Figure 8:
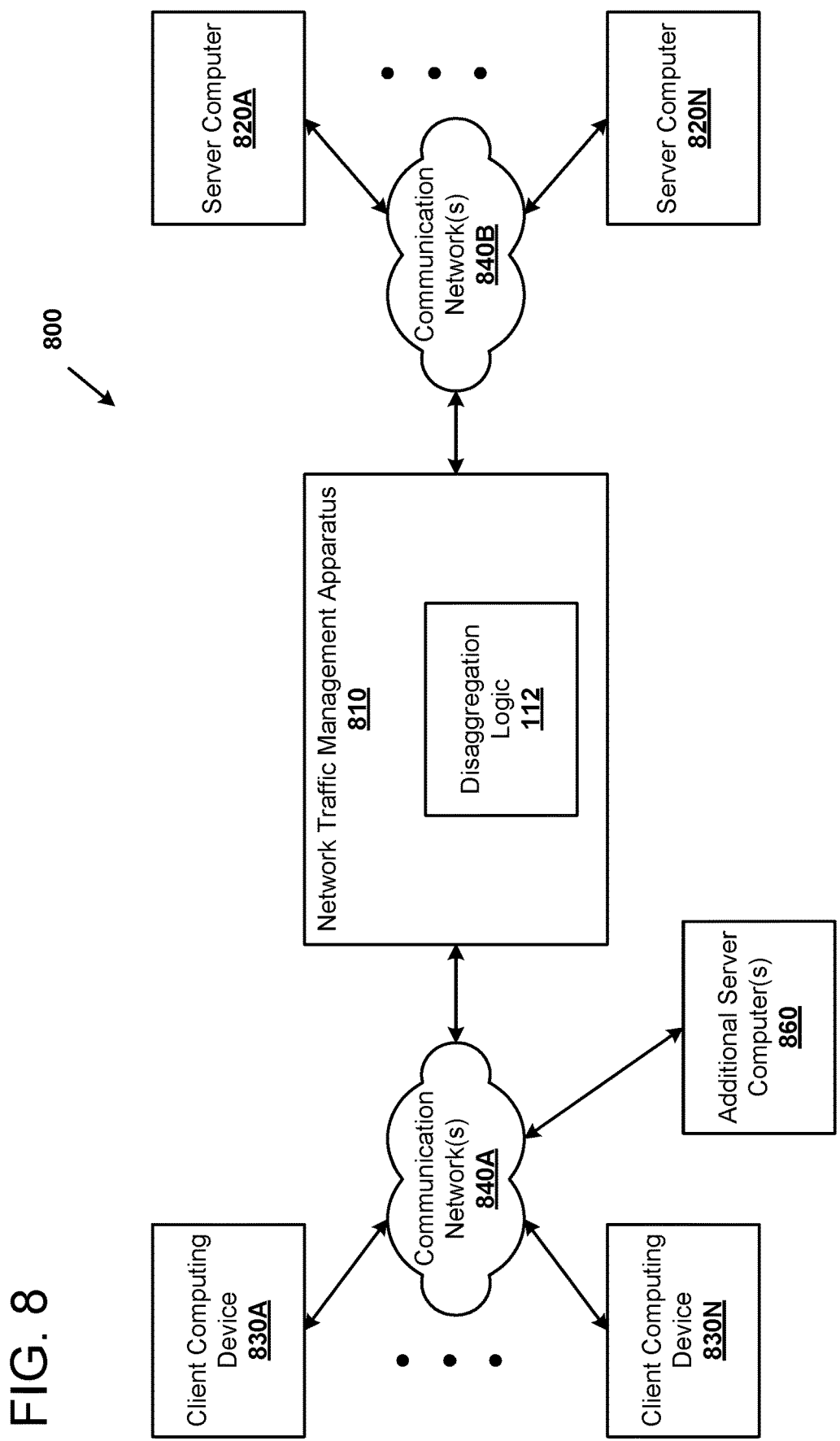
FIG. 8 is a block diagram of an example client-server architecture including a network traffic management apparatus executing disaggregation logic.

FIG. 8 illustrates an example client-server architecture 800 that incorporates a network traffic management apparatus 810 including an intermediary server 850. The client-server architecture 800 includes a network traffic management apparatus 810 that is coupled to one or more server computers (such as server computers 820A-N), and one or more client devices (such as client computing devices 830A-N) via one or more communication networks (such as the communication networks 840A and 840B). The server computers 820A-N can communicate with one or more additional server computer(s), such as the server computer 860, that are accessible via the communication networks 840A. As one example, the communication network 840A can include a public network (e.g., the Internet) and devices attached to the network 840A can be accessed using public network addresses; the communication network 840B can include a private network and devices attached to the network 840B can be accessed using private network addresses.

The communication networks 840A-B can include various wired and/or wireless communication technologies, such as a local area network (LAN), a wide area network (WAN), an intranet, the Internet, a public switched telephone network (PSTN), and so forth. The devices connected to the communication networks 840A-B can communicate with each other using various communications protocols, such as transmission control protocol with Internet protocol (TCP/IP) over Ethernet and/or other customized or industry-standard protocols. The communication protocols can be used to transmit information over the networks 840A-B using packet-based messages (e.g., Ethernet-based packet data networks) and/or other application programming interfaces (APIs). An API is a programmatic interface (e.g., a set of methods and/or protocols) for communicating among different modules. The communication networks 840A-B can include various network devices, such as switches (multilayer or single-layer), routers, repeaters, gateways, network bridges, hubs, protocol converters, bridge routers, proxy servers, firewalls, network address translators, multiplexers, network interface controllers, wireless network interface controllers, modems, line drivers, and wireless access points, for example. As illustrated, the network traffic management apparatus 810 is positioned in-line between the client computing devices 830A-N and the server computers 820A-N so that the network traffic management apparatus 810 can intercept all network traffic flowing between the different networks 840A and 840B. In other examples, the network traffic management apparatus 810, the server computer 820A-N, and the client devices 830A-N can be coupled together via other topologies. As one specific example, the server computers 820A-N can be integrated within the network traffic management system 800 (e.g., server computer functions can be implemented in software within one or more devices of the network traffic management apparatus 810). It should be appreciated by one of ordinary skill in the art having the benefit of the present disclosure, that the network topology illustrated in FIG. 8 has been simplified and that multiple networks and networking devices can be utilized to interconnect the various computing systems disclosed herein. Additionally, one or more of the devices of the client-server architecture 800 in these examples can be in a same or a different communication network including one or more public, private, or cloud networks, for example.

Generally, the server computers 820A-N, the server computer(s) 860, the client devices 830A-N, and the network traffic management system 800 can perform various computing tasks that are implemented using a computing environment, such as the computing environment described in more detail with respect to FIG. 8. The computing environment can include computer hardware, computer software, and combinations thereof. As a specific example, the computing environment can include general-purpose and/or special-purpose processor(s), configurable and/or hard-wired electronic circuitry, a communications interface, and computer-readable memory for storing computer-executable instructions to enable the processor(s) to perform a given computing task. The logic to perform a given task can be specified within a single module or interspersed among multiple modules. As used herein, the terms "module" and "component" can refer to an implementation within one or more dedicated hardware devices or apparatus (e.g., computer(s)), and/or an implementation within software hosted by one or more hardware devices or apparatus that may be hosting one or more other software applications or implementations.

The client devices 830A-N can include any type of computing device that can exchange network data, such as mobile communication devices, laptop computers, desktop computers, tablet computers, virtual machines executing within a cloud-computer-based environment, and so forth. The client devices 830A-N can run interface applications, such as web browsers or standalone client applications, which may provide an interface to communicate with (e.g., make requests for, and receive content stored on) one or more of the server computers 820A-N via the communication network(s) 840A and 840B. The client devices 830A-N can further include an output device (such as a display screen or touchscreen (not illustrated)) and/or an input device (such as a keyboard (not illustrated)). Additionally, one or more of the client devices 830A-N can be configured to execute software code (e.g., JavaScript code within a web browser) in order to log client-side data and provide the logged data to the network traffic management apparatus 810 or the server computers 820A-N.

The server computers 820A-N and 860 can include any type of computing device that can exchange network data. For example, the server computers 820A-N can exchange network data with the client devices 830A-N, with each other, and/or with the server computer(s) 860. As another example, the server computers 820A-N can exchange communications along communication paths specified by application logic in order to facilitate a client-server application interacting with the client devices 830A-N. Examples of the server computers 820A-N can include application servers, database servers, access control servers, and encryption servers. Accordingly, in some examples, one or more of the server computers 820A-N process login and other requests received from the client devices 830A-N via the communication network(s) 840A and 840B according to the Hypertext Transfer Protocol (HTTP) or Hypertext Transfer Protocol Secure (HTTPS) application-layer protocol. A web application may be operating on one or more of the server computers 820A-N and transmitting data (e.g., files or web pages) to the client devices 830A-N (e.g., via the network traffic management apparatus 810) in response to requests from the client devices 830A-N. The server computers 820A-N can be hardware and/or software and may represent a system with multiple servers in a pool, which may include internal or external networks.

While the server computers 820A-N are illustrated as single devices, one or more actions of each of the server computers 820A-N may be distributed across one or more distinct network computing devices that together comprise one or more of the server computers 820A-N. Moreover, the server computers 820A-N are not limited to a particular configuration. Thus, the server computers 820A-N may contain network computing devices that operate using a coordinated approach, whereby one of the network computing devices of the server computers 820A-N operate to manage or otherwise coordinate operations of the other network computing devices. Each of the server computers 820A-N can operate as a networked computing device within a cluster architecture, a computing device within a peer-to peer architecture, a virtual machine, or a resource within a cloud-based computer architecture, for example. Thus, the technology disclosed herein is not to be construed as being limited to a single environment and other configurations and architectures are also envisaged. For example, one or more of the server computers 820A-N can operate within the network traffic management apparatus 810 itself rather than as a stand-alone server device communicating with the network traffic management apparatus 810 via communication network 840B. In this example, the one or more of the server computers 820A-N operate within the memory of the network traffic management apparatus 810.

The network traffic management apparatus 810 can include any type of computing device that can be used for managing network traffic. The network traffic management apparatus 810 can perform a number of functions, including providing network security, access control, load balancing network traffic across the server computers 820A-N, and/or accelerating network traffic associated with an application hosted by one or more of the server computers 820A-N, for example. The network traffic management apparatus 810 includes a disaggregation logic module 112 that is used to distribute network traffic that is destined for the server computers 820A-N. Additionally, the network traffic management apparatus 810 can include other network devices such as one or more routers or switches, for example In one example, the network traffic management apparatus 810 can be a dedicated computing device including a processor (not illustrated) and a computer-readable memory (not illustrated). The memory of the network traffic management apparatus 810 can store one or more applications that can include computer-executable instructions that, when executed by the network traffic management apparatus 810, cause the network traffic management apparatus 810 to perform actions, such as to transmit, receive, or otherwise process messages, for example, and to perform other actions described and illustrated above with reference to FIGS. 1-7. Specifically, the memory can include computer-executable instructions for performing the functions of disaggregating network traffic. The application(s) can be implemented as components of other applications. Further, the application(s) can be implemented as operating system extensions, plugins, or the like.

While the network traffic management apparatus 810 is illustrated in this example as including a single device, the network traffic management apparatus 810 in other examples can include a plurality of devices or blades each having one or more processors (each processor with one or more processing cores) that implement one or more components of this technology. In these examples, one or more of the devices can have a dedicated communication interface or memory. Alternatively, one or more of the devices can utilize the memory, communication interface, or other hardware or software components of one or more other devices included in the network traffic management apparatus 810. Additionally, the network traffic management apparatus 810 and/or the application(s) executed by the network traffic management apparatus 810 can be operative in a cloud-based computing environment. The application(s) can be executed within or as virtual machine(s) or virtual server(s) that can be managed in a cloud-based computing environment. For example, the application(s), and even the network traffic management apparatus 810 itself, can be located in virtual server(s) running in a cloud-based computing environment rather than being tied to one or more specific physical network computing devices. Also, the application (s) can be running in one or more virtual machines (VMs) executing on the network traffic management apparatus 810. Additionally, in one or more examples of this technology, virtual machine(s) running on the network traffic management apparatus 810 can be managed or supervised by a hypervisor. Additionally, one or more of the components that together comprise the network traffic management apparatus 810 can be standalone devices or integrated with one or more other devices or apparatuses, such as with one or more of the server computers 820A-N, for example.

Additionally, one or more of the components depicted in the client-server architecture 800, such as the network traffic management apparatus 810, server computers 820A-N and 860, or client computing devices 830A-N, for example, may be configured to operate as virtual instances on the same physical machine. In other words, one or more of the network traffic management apparatus 810, server computers 820A-N and 860, or client computing devices 830A-N may operate on the same physical device rather than as separate devices communicating through communication networks 840A and 840B. Additionally, there may be more or fewer network traffic management apparatuses, client computing devices, or server computers than illustrated in FIG. 8.

Figure 9:
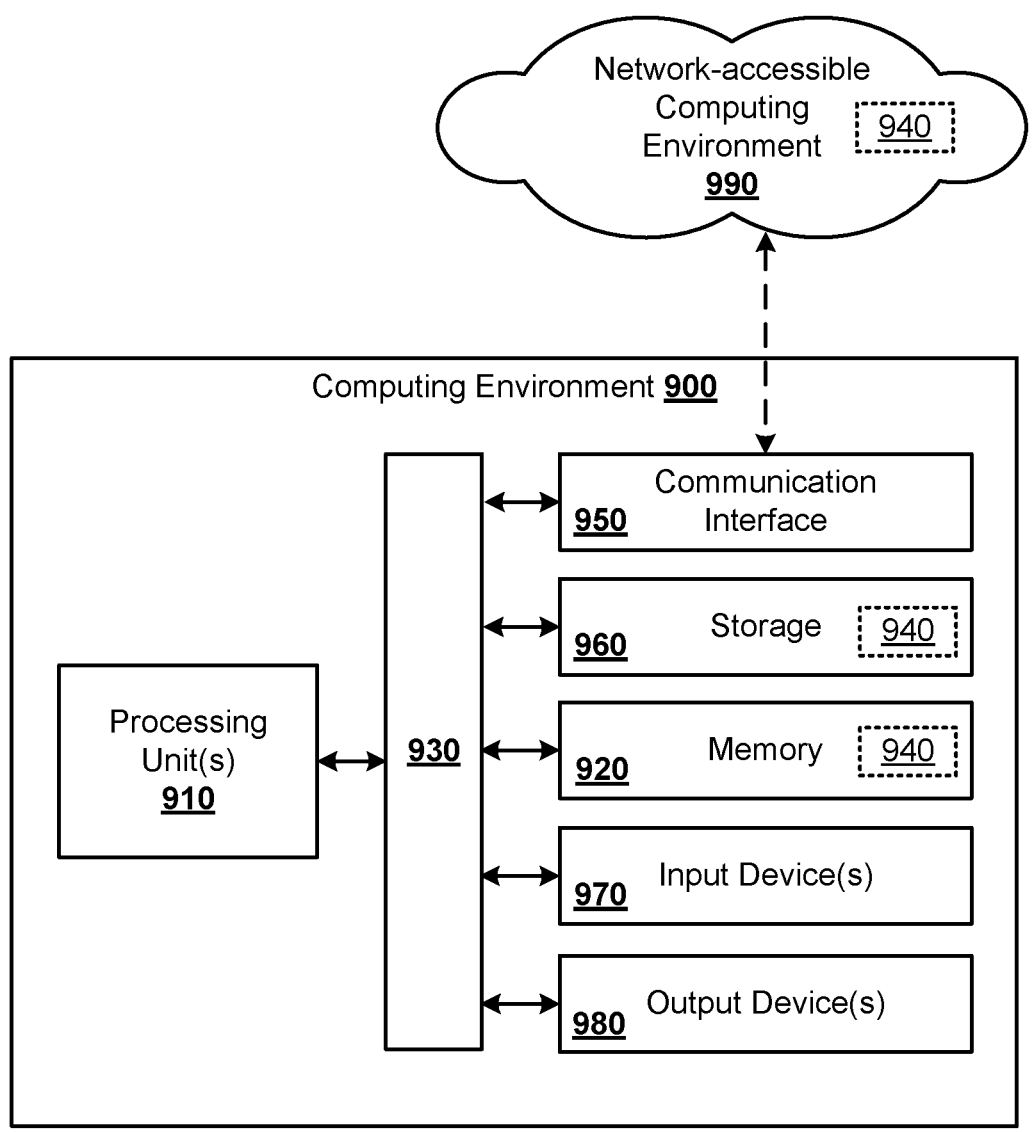
FIG. 9 is a block diagram of an example computing environment, such as can be used for disaggregation logic.

FIG. 9 illustrates a block diagram of a generalized example of a suitable computing environment 900 that can be used to implement the examples, techniques, and technologies described herein. For example, the computing environment 900 can be used to implement a network traffic management apparatus including an intermediary server that performs the disclosed techniques for disaggregating network traffic.

The computing environment 900 includes at least one processing unit 910 and computer-readable memory 920, which are coupled together by an interconnect 930. The processing unit 910 executes computer-executable instructions. The processing unit 910 can include a general-purpose processor, a special-purpose processor, and combinations thereof. For example, the processing unit 910 can include a general-purpose central processing unit (CPU), a graphics processor, a processor in an application-specific integrated circuit (ASIC), a processor configured to operate using programmable logic (such as in a field-programmable gate array (FPGA)), and/or any other type of processor. In a multi-processing system, multiple processing units can be used to execute computer-executable instructions to increase processing power.

The memory 920 stores software 940 implementing one or more innovations described herein, in the form of computer-executable instructions suitable for execution by the processing unit 910. Specifically, the memory 920 can be used to store computer-executable instructions, data structures, input data, output data, and other information. The memory 920 can include volatile memory (e.g., registers, cache, random-access memory (RAM)), non-volatile memory (e.g., read-only memory (ROM), electrically-erasable programmable ROM (EEPROM), and flash memory), and/or combinations thereof. The memory 920 can include operating system software (not illustrated). Operating system software can provide an operating environment for other software executing in the computing environment 900 and can coordinate activities of the components of the computing environment 900.

The interconnect 930 is used to connect different components of the computing environment 900 together so that the processing unit 910 can communicate with the different components and/or so that the different components can communicate with each other. For example, the interconnect 930 can include a bus, controller, and/or a network. As one example, the interconnect 930 can include a host bridge (also referred to as a northbridge) for connecting the processing unit 910 to relatively high-speed components (such as the memory 920) and an input/output bridge (also referred to as a southbridge) for connecting to relatively lower-speed components (such as a communications interface 950) within the computing environment 900. In some examples, one or more components of the computing environment 900 can be integrated within or connected directly to the processing unit 910.

The computing environment 900 can include a communication interface 950 for communicating with another computing entity using a communication medium (e.g., a physical layer). The communication interface 950 can implement all or a portion of a network protocol stack. The network protocol stack defines communication formats and rules for communicating between different devices connected to a network. For example, the network protocol stack can define modular layers for communication using the Open Systems Interconnection (OSI) model or another model. The OSI model standardizes and partitions a communication system into seven layers including a physical layer (referred to as layer 1) and an application layer (referred to as layer 7). The application layer can be used to define how applications access the communications subsystem. The physical layer defines the electrical and physical specifications for communication over a communication medium (also referred to as a physical transmission medium). The communication medium can be used to convey information, such as computer-executable instructions or other data, in a modulated data signal. A modulated data signal is a signal that has one or more of its characteristics adjusted in such a manner as to encode information in the signal. The communication interface 950 can include electronic and/or optical circuitry to receive and transmit communications signals that are encoded (e.g., according to a physical layer specification of the network stack) using an electrical, optical, radio-frequency (RF), or another carrier signal. Accordingly, the communication interface 950 can be used to communicate over wired connections (e.g., twisted-wire pair, coaxial cable, and fiber optic connections) and/or wireless technologies (e.g., Bluetooth, WiFi (IEEE 802.11), and cellular). As a specific example with reference to FIG. 8, a communication interface of the network traffic management apparatus 810 operatively couples to and communicates with the communication networks 840A and 840B so that the network traffic management apparatus 810 is coupled to and can communicate with the server computers 820A-N and 860 and the client computing devices 830A-N.

The computing environment 900 can include storage 960 that is used to store instructions for the software 940, data structures, and data, which can be used to implement the technologies described herein. The storage 960 can include electronic circuitry for reading and/or writing to removable or non-removable storage media using magnetic, optical, or other reading and writing system that is coupled to the processor. The storage 960 can include read-only storage media and/or readable and writeable storage media, such as magnetic disks, solid state drives, magnetic tapes or cassettes, CD-ROMs, CD-RWs, DVDs, or any other medium which can be used to store information and that can be accessed within the computing environment 900.

The computing environment 900 can include input device(s) 970. For example, the input device(s) 970 can provide an input interface to a user of the computing environment 900 and/or to receive inputs from a physical environment. The input device(s) 970 can include a tactile input device (e.g., a keyboard, a mouse, or a touchscreen), a microphone, a camera, a sensor, or another device that provides input to the computing environment 900.

The computing environment 900 can include output device(s) 980. For example, the output device(s) 980 can provide an output interface to a user of the computing environment 900 and/or to generate an output observable in a physical environment. The output device(s) 980 can include a light-emitting diode, a display, a printer, a speaker, a CD-writer, or another device that provides output from the computing environment 900. In some examples, the input device(s) 970 and the output device(s) 980 can be used together to provide a user interface to a user of the computing environment 900.

The computing environment 900 is not intended to suggest limitations as to scope of use or functionality of the technology, as the technology can be implemented in diverse general-purpose and/or special-purpose computing environments. For example, the disclosed technology can be practiced in a local, distributed, and/or network-enabled computing environment. In distributed computing environments, tasks are performed by multiple processing devices. Accordingly, principles and advantages of distributed processing, such as redundancy, parallelization, and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof. As a specific example, a distributed computing environment can include the processing unit 910 and the network-accessible computing environment 990 that is linked through a communications network. In a distributed computing environment, program modules 940 (including executable instructions for disaggregating network traffic) can be located in both local and remote memory storage devices.

The term computer-readable media includes non-transient media for data storage, such as memory 920 and storage 960, and does not include transmission media such as modulated data signals and carrier waves. Any of the disclosed methods can be implemented as computer-executable instructions stored on one or more computer-readable media and executed on a computer (e.g., any commercially available computer). Any of the computer-executable instructions for implementing the disclosed techniques as well as any data structures and data created and used during implementation of the disclosed embodiments can be stored on one or more computer-readable storage media. For example, the computer-executable instructions can be part of a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, or other such network) using one or more network-attached computers.

This disclosure is set forth in the context of representative examples that are not intended to be limiting. Accordingly, this disclosure is directed toward all novel and non-obvious features and aspects of the various disclosed examples, alone and in various combinations and sub-combinations with one another. Many variations of the specific hardware and software used to implement the examples are possible, as will be appreciated by those skilled in the relevant art with the benefit of this disclosure. The disclosed systems, methods, and apparatus are not limited to any specific aspect or feature or combinations thereof, nor does the disclosed technology require that any one or more specific advantages be present or problems be solved. Theories of operation, scientific principles, or other theoretical descriptions presented herein in reference to the disclosed technology have been provided for the purposes of better understanding and are not intended to be limiting in scope. The apparatus and methods in the appended claims are not limited to those apparatus and methods that function in the manner described by such theories of operation.

As used in this application the singular forms "a," "an," and "the" include the plural forms unless the context clearly dictates otherwise. The term "coupled" encompasses mechanical, electrical, magnetic, optical, as well as other practical ways of coupling or linking items together, and does not exclude the presence of intermediate elements between the coupled items. The term "and/or" means any one item or combination of items in the phrase.

The recited order of processing elements or sequences, or the use of numbers, letters, or other designations therefore, is not intended to limit the claimed processes to any order. Although the operations of some of the disclosed methods are described in a particular, sequential order for convenient presentation, it should be understood that this manner of description encompasses rearrangement, unless a particular ordering is required by specific claim language set forth below. For example, operations described sequentially may in some cases be rearranged or performed concurrently. Moreover, for the sake of simplicity, the attached figures may not show all of the various ways in which the disclosed methods can be used in conjunction with other methods.

It should also be well understood that any software functionality described herein can be performed, at least in part, by one or more hardware logic components, instead of software. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so forth.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Having thus described many possible embodiments to which the principles of the invention may be applied, it will be recognized by those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the scope of the claimed subject matter is defined by the following claims. We therefore claim as our invention all that comes within the scope of these claims.

What is claimed is:

1. A method for disaggregating network flows implemented in cooperation with a network traffic management system comprising one or more network traffic management modules, networking modules, or server modules, the method comprising:
before a learning period begins, determining whether individual network flows are members within a first subset of the network flows processed by a first server, the membership of each network flow within a particular subset of the network flows based on one or more portions of a network packet of each network flow;
in response to determining a change in a number of servers available to service the network flows, beginning the learning period where a second subset of the first subset of network flows is learned, the second subset of network flows including network flows from the first subset of network flows having network packets that transit the network traffic management system during the learning period;
after the learning period ends, dividing the first subset of network flows wherein network packets that are members of the first subset of network flows and the learned second subset of the first subset of network flows are forwarded to the first server and network packets that are being a members of the first subset of network flows but not members of the learned second subset of the first subset of network flows are forwarded to a second server, the second server different from the first server.

2. The method of claim 1, wherein determining the membership of individual network packets comprises determining a hash value of the one or more portions of each network packet, and mapping the hash value to a particular subset of the network flows.

3. The method of claim 1, wherein the learned second subset of the first subset of network flows is learned during a time period beginning after the number of servers servicing the set of network flows has changed and ending after a time-out period of at least one of the network flows.

4. The method of claim 1, wherein a learned flow is removed from the learned second subset in response to not detecting traffic of the learned flow within a sweeping time interval.

5. The method of claim 1, wherein the second subset of network flows is emptied in response to an occurrence of a threshold event so that all network flows within the first subset are forwarded to the second server.

6. A system comprising one or more network traffic management modules, networking modules, or server modules, memory comprising programmed instructions stored thereon, and one or more processors configured to be capable of executing the stored programmed instructions to:
before a learning period begins, determine whether individual network flows are members within a first subset of the network flows processed by a first server, the membership of each network flow within a particular subset of the network flows based on one or more portions of a network packet of each network flow;
in response to determining a change in a number of servers available to service the network flows, beginning the learning period where a second subset of the first subset of network flows is learned, the second subset of network flows including network flows from the first subset of network flows having network packets that transit the one or more network traffic management modules during the learning period;
after the learning period ends, divide the first subset of network flows wherein network packets that are members of the first subset of network flows and the learned second subset of the first subset of network flows are forwarded to the first server and network packets that are members of the first subset of network flows but not members of the learned second subset of the first subset of network flows are forwarded to a second server, the second server different from the first server.

7. The system of claim 6, wherein determining the membership of individual network packets comprises determining a hash value of the one or more portions of each network packet, and mapping the hash value to a particular subset of the network flows.

8. The system of claim 6, wherein the learned second subset of the first subset of network flows is learned during a time period beginning after the number of servers servicing the set of network flows has changed and ending after a time-out period of at least one of the network flows.

9. The system of claim 6, wherein a learned flow is removed from the learned second subset in response to not detecting traffic of the learned flow within a sweeping time interval.

10. The system of claim 6, wherein the second subset of network flows is emptied in response to an occurrence of a threshold event so that all network flows within the first subset are forwarded to the second server.

11. A non-transitory computer readable medium having stored thereon instructions for disaggregating network traffic comprising executable code that, when executed by one or more processors, causes the processors to:
before a learning period begins, determine whether individual network flows are members within a first subset of the network flows processed by a first server, the membership of each network flow within a particular subset of the network flows based on one or more portions of a network packet of each network flow;
in response to determining a change in a number of servers available to service the network flows, beginning the learning period where a second subset of the first subset of network flows is learned, the second subset of network flows including network flows from the first subset of network flows having network packets that transit a network traffic management system during the learning period;
after the learning period ends, dividing the first subset of network flows wherein network packets that are members of the first subset of network flows and the learned second subset of the first subset of network flows are forwarded to the first server and network packets that are members of the first subset of network flows but not members of the learned second subset of the first subset of network flows are forwarded to a second server, the second server different from the first server.

12. The non-transitory computer readable medium of claim 11, wherein determining the membership of individual network packets comprises determining a hash value of the one or more portions of each network packet, and mapping the hash value to a particular subset of the network flows.

13. The non-transitory computer readable medium of claim 11, wherein the learned second subset of the first subset of network flows is learned during a time period beginning after the number of servers servicing the set of network flows has changed and ending after a time-out period of at least one of the network flows.

14. The non-transitory computer readable medium of claim 11, wherein a learned flow is removed from the learned second subset in response to not detecting traffic of the learned flow within a sweeping time interval.

15. The non-transitory computer readable medium of claim 11, wherein the second subset of network flows is emptied in response to an occurrence of a threshold event so that all network flows within the first subset are forwarded to the second server.

16. A network traffic management apparatus, comprising memory comprising programmed instructions stored thereon and one or more processors configured to be capable of executing the stored programmed instructions to:

before a learning period begins, determine whether individual network flows are members within a first subset of the network flows processed by a first server, the membership of each network flow within a particular subset of the network flows based on one or more portions of a network packet of each network flow;

in response to determining a change in a number of servers available to service the network flows, beginning the learning period where a second subset of the first subset of network flows is learned, the second subset of network flows including network flows from the first subset of network flows having network packets that transit the network traffic management apparatus during the learning period;

after the learning period ends, dividing the first subset of network flows wherein network packets that are members of the first subset of network flows and the learned second subset of the first subset of network flows are forwarded to the first server and network packets that are members of the first subset of network flows but not members of the learned second subset of the first subset of network flows are forwarded to a second server, the second server different from the first server.

17. The network traffic management apparatus of claim 16, wherein determining the membership of individual network packets comprises determining a hash value of the one or more portions of each network packet, and mapping the hash value to a particular subset of the network flows.

18. The network traffic management apparatus of claim 16, wherein the learned second subset of the first subset of network flows is learned during a time period beginning after the number of servers servicing the set of network flows has changed and ending after a time-out period of at least one of the network flows.

19. The network traffic management apparatus of claim 16, wherein a learned flow is removed from the learned second subset in response to not detecting traffic of the learned flow within a sweeping time interval.

20. The network traffic management apparatus of claim 16, wherein the second subset of network flows is emptied in response to an occurrence of a threshold event so that all network flows within the first subset are forwarded to the second server.

* * * * *